US012445980B2

(12) United States Patent
Regev et al.

(10) Patent No.: US 12,445,980 B2
(45) Date of Patent: Oct. 14, 2025

(54) DEMODULATION REFERENCE SIGNAL SHARING ACROSS USER EQUIPMENTS (UES) SUPPORTING OVER THE AIR DIGITAL PRE-DISTORTION

(71) Applicant: QUALCOMM Incorporated, San Diego, CA (US)

(72) Inventors: Aviv Regev, Tel Aviv (IL); Ronen Shaked, Kfar Saba (IL); Elad Meir, Ramat Gan (IL); Gideon Shlomo Kutz, Ramat Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 444 days.

(21) Appl. No.: 18/168,088

(22) Filed: Feb. 13, 2023

(65) Prior Publication Data

US 2024/0276403 A1    Aug. 15, 2024

(51) Int. Cl.
*H04B 7/185* (2006.01)
*H04L 5/00* (2006.01)
*H04W 52/52* (2009.01)
*H04W 72/0453* (2023.01)

(52) U.S. Cl.
CPC ........... *H04W 52/52* (2013.01); *H04L 5/0051* (2013.01); *H04W 72/0453* (2013.01)

(58) Field of Classification Search
CPC . H04W 52/52; H04W 72/0453; H04W 52/24; H04W 52/50; H04W 52/16; H04W 52/12; H04W 52/146; H04L 5/0051; H04L 5/0048
See application file for complete search history.

(56) References Cited

U.S. PATENT DOCUMENTS

| 9,596,061 | B2 * | 3/2017 | Wallén | H04L 5/0048 |
| 2011/0305161 | A1 * | 12/2011 | Ekpenyong | H04L 5/001 370/252 |
| 2018/0102817 | A1 * | 4/2018 | Park | H04B 7/0417 |
| 2018/0331804 | A1 * | 11/2018 | Hessler | H04L 5/0007 |
| 2022/0021423 | A1 * | 1/2022 | Ahmed | H04L 5/0051 |
| 2024/0032063 | A1 * | 1/2024 | Grossmann | H04L 5/0044 |

* cited by examiner

*Primary Examiner* — Phuongchau Ba Nguyen
(74) *Attorney, Agent, or Firm* — Holland & Hart LLP

(57) ABSTRACT

Methods, systems, and devices for wireless communications are described. The described techniques relate to improved methods, systems, devices, and apparatuses that support demodulation reference signal sharing across user equipments (UEs) supporting over the air (OTA) digital pre-distortion (DPD). For example, the described techniques provide for demodulation reference signal (DMRS) sharing across UEs supporting OTA DPD. A network entity may share a full DMRS pattern with multiple frequency-division multiplexed (FDMed) UEs. Based on the shared DMRS pattern, the UEs may evaluate the non-linear impairment by estimating non-linearity (NL) compensation function coefficients. Each of the UEs may indicate, to the network entity, their estimated NL compensation function coefficients. The network entity may apply an updated NL compensation function based on the NL compensation function coefficients from the various UEs and transmit a downlink transmission according to the updated NL compensation function.

20 Claims, 15 Drawing Sheets

DEMODULATION REFERENCE SIGNAL SHARING ACROSS USER EQUIPMENTS (UES) SUPPORTING OVER THE AIR DIGITAL PRE-DISTORTION

FIELD OF TECHNOLOGY

The following relates to wireless communications, including demodulation reference signal sharing across user equipments (UEs) supporting over the air (OTA) digital pre-distortion (DPD).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support demodulation reference signal sharing across user equipments (UEs) supporting over the air (OTA) digital pre-distortion (DPD). For example, the described techniques provide for demodulation reference signal (DMRS) sharing across UEs supporting OTA DPD. A network entity may share a full DMRS pattern with multiple frequency-division multiplexed (FDMed) UEs. Based on the shared DMRS pattern, the UEs may evaluate the non-linear impairment by estimating non-linearity (NL) compensation function coefficients. Each of the UEs may indicate, to the network entity, their estimated NL compensation function coefficients. The network entity may apply an updated NL compensation function based on the NL compensation function coefficients from the various UEs and transmit a downlink transmission according to the updated NL compensation function.

A method for wireless communications at a user equipment (UE) is described. The method may include receiving, from a network entity, control signaling indicating a demodulation reference signal pattern associated with a set of frequency resources, where a set of multiple frequency subsets of the set of frequency resources are allocated to respective UEs of a set of frequency-division multiplexed UEs including the UE, transmitting a set of power amplifier coefficient values associated with a non-linear impairment compensation function based on the demodulation reference signal pattern, and receiving downlink signaling based on the set of power amplifier coefficient values.

An apparatus for wireless communications at a UE is described. The apparatus may include a processor, memory coupled with the processor, and instructions stored in the memory. The instructions may be executable by the processor to cause the apparatus to receive, from a network entity, control signaling indicating a demodulation reference signal pattern associated with a set of frequency resources, where a set of multiple frequency subsets of the set of frequency resources are allocated to respective UEs of a set of frequency-division multiplexed UEs including the UE, transmit a set of power amplifier coefficient values associated with a non-linear impairment compensation function based on the demodulation reference signal pattern, and receive downlink signaling based on the set of power amplifier coefficient values.

Another apparatus for wireless communications at a UE is described. The apparatus may include means for receiving, from a network entity, control signaling indicating a demodulation reference signal pattern associated with a set of frequency resources, where a set of multiple frequency subsets of the set of frequency resources are allocated to respective UEs of a set of frequency-division multiplexed UEs including the UE, means for transmitting a set of power amplifier coefficient values associated with a non-linear impairment compensation function based on the demodulation reference signal pattern, and means for receiving downlink signaling based on the set of power amplifier coefficient values.

A non-transitory computer-readable medium storing code for wireless communications at a UE is described. The code may include instructions executable by a processor to receive, from a network entity, control signaling indicating a demodulation reference signal pattern associated with a set of frequency resources, where a set of multiple frequency subsets of the set of frequency resources are allocated to respective UEs of a set of frequency-division multiplexed UEs including the UE, transmit a set of power amplifier coefficient values associated with a non-linear impairment compensation function based on the demodulation reference signal pattern, and receive downlink signaling based on the set of power amplifier coefficient values.

Some examples of the method, apparatuses, and non-transitory computer-readable medium described herein may further include operations, features, means, or instructions for receiving, during a symbol period of a first slot, one or more demodulation reference signals according to the demodulation reference signal pattern and estimating the set of power amplifier coefficient values based on detecting residual non-linear impairments to an observed signal including the one or more demodulation reference signals spanning the set of frequency resources according to the demodulation reference signal pattern.

Some examples of the method, apparatuses, and non-transitory computer-readable medium described herein may further include operations, features, means, or instructions for receiving control signaling allocating one subset of the set of frequency resources for wireless communications by the UE, monitoring the set of frequency resources for downlink communications during one or more symbol periods of a slot, where receiving the one or more demodulation reference signals may be based on the monitoring, and performing one or more measurements for the set of frequency resources during a symbol period allocated for demodulation reference signals according to the demodulation reference signal pattern, where estimating the set of power amplifier coefficient values may be based on the monitoring.

Some examples of the method, apparatuses, and non-transitory computer-readable medium described herein may further include operations, features, means, or instructions for receiving, from the network entity, an indication of a codebook including a set of multiple candidate demodulation reference signal patterns, where receiving the control signaling indicating the demodulation reference signal pattern includes receiving an index indicating one of the set of multiple candidate demodulation reference signal patterns.

Some examples of the method, apparatuses, and non-transitory computer-readable medium described herein may further include operations, features, means, or instructions for estimating a channel quality based on the demodulation reference signal pattern, where the set of power amplifier coefficient values may be based on the estimated channel quality.

Some examples of the method, apparatuses, and non-transitory computer-readable medium described herein may further include operations, features, means, or instructions for detecting an initial residual non-linear impairment to a first observed signal associated with one or more demodulation reference signals received according to the demodulation reference signal pattern and detecting an updated residual non-linear impairment to a second observed signal associated with the downlink signaling, where the updated residual non-linear impairment to the second observed signal may be less than the initial residual non-linear impairment to the first observed signal based on the set of power amplifier coefficient values.

A method for wireless communications at a network entity is described. The method may include transmitting, to a UE, control signaling indicating a demodulation reference signal pattern associated with a set of frequency resources, where a set of multiple frequency subsets of the set of frequency resources are allocated to respective UEs of a set of frequency-division multiplexed UEs including the UE, receiving, from the UE, a set of power amplifier coefficient values associated with a non-linear impairment compensation function based on the demodulation reference signal pattern, and transmitting, to the UE, downlink signaling based on the set of power amplifier coefficient values.

An apparatus for wireless communications at a network entity is described. The apparatus may include a processor, memory coupled with the processor, and instructions stored in the memory. The instructions may be executable by the processor to cause the apparatus to transmit, to a UE, control signaling indicating a demodulation reference signal pattern associated with a set of frequency resources, where a set of multiple frequency subsets of the set of frequency resources are allocated to respective UEs of a set of frequency-division multiplexed UEs including the UE, receive, from the UE, a set of power amplifier coefficient values associated with a non-linear impairment compensation function based on the demodulation reference signal pattern, and transmit, to the UE, downlink signaling based on the set of power amplifier coefficient values.

Another apparatus for wireless communications at a network entity is described. The apparatus may include means for transmitting, to a UE, control signaling indicating a demodulation reference signal pattern associated with a set of frequency resources, where a set of multiple frequency subsets of the set of frequency resources are allocated to respective UEs of a set of frequency-division multiplexed UEs including the UE, means for receiving, from the UE, a set of power amplifier coefficient values associated with a non-linear impairment compensation function based on the demodulation reference signal pattern, and means for transmitting, to the UE, downlink signaling based on the set of power amplifier coefficient values.

A non-transitory computer-readable medium storing code for wireless communications at a network entity is described. The code may include instructions executable by a processor to transmit, to a UE, control signaling indicating a demodulation reference signal pattern associated with a set of frequency resources, where a set of multiple frequency subsets of the set of frequency resources are allocated to respective UEs of a set of frequency-division multiplexed UEs including the UE, receive, from the UE, a set of power amplifier coefficient values associated with a non-linear impairment compensation function based on the demodulation reference signal pattern, and transmit, to the UE, downlink signaling based on the set of power amplifier coefficient values.

Some examples of the method, apparatuses, and non-transitory computer-readable medium described herein may further include operations, features, means, or instructions for transmitting, to the UE, an indication of a codebook including a set of multiple candidate demodulation reference signal patterns, where transmitting the control signaling indicating the demodulation reference signal pattern includes transmitting an index indicating one of the candidate demodulation reference signal patterns.

Some examples of the method, apparatuses, and non-transitory computer-readable medium described herein may further include operations, features, means, or instructions for transmitting one or more demodulation reference signals during a symbol of a first slot without applying the non-linear impairment compensation function and updating the non-linear impairment compensation function according to the set of power amplifier coefficient values, where transmitting the downlink signaling may be based on applying the updated non-linear impairment compensation function.

Some examples of the method, apparatuses, and non-transitory computer-readable medium described herein may further include operations, features, means, or instructions for transmitting, to a second UE of the set of UEs, control signaling indicating the demodulation reference signal pattern associated with the set of frequency resources, where the UE may be allocated a first subset of the set of frequency resources and the second UE may be allocated a second subset of the set of frequency resources and receiving, from the second UE, a second set of power amplifier coefficient values associated with the non-linear impairment compensation function based on the demodulation reference signal pattern.

Some examples of the method, apparatuses, and non-transitory computer-readable medium described herein may further include operations, features, means, or instructions for combining the set of power amplifier coefficient values and the second set of power amplifier coefficient values and updating the non-linear impairment compensation function according to the combining, where transmitting the downlink signaling may be based on the updated non-linear impairment compensation function.

Some examples of the method, apparatuses, and non-transitory computer-readable medium described herein may further include operations, features, means, or instructions for receiving, from the UE based on transmitting the downlink signaling, a second set of power amplifier coefficient values associated with a non-linear impairment compensation function based on the demodulation reference signal pattern, updating the non-linear impairment compensation function according to the second set of power amplifier coefficient values, and transmitting additional downlink signaling based on applying the updated non-linear impairment compensation function.

DETAILED DESCRIPTION

Figure 1:
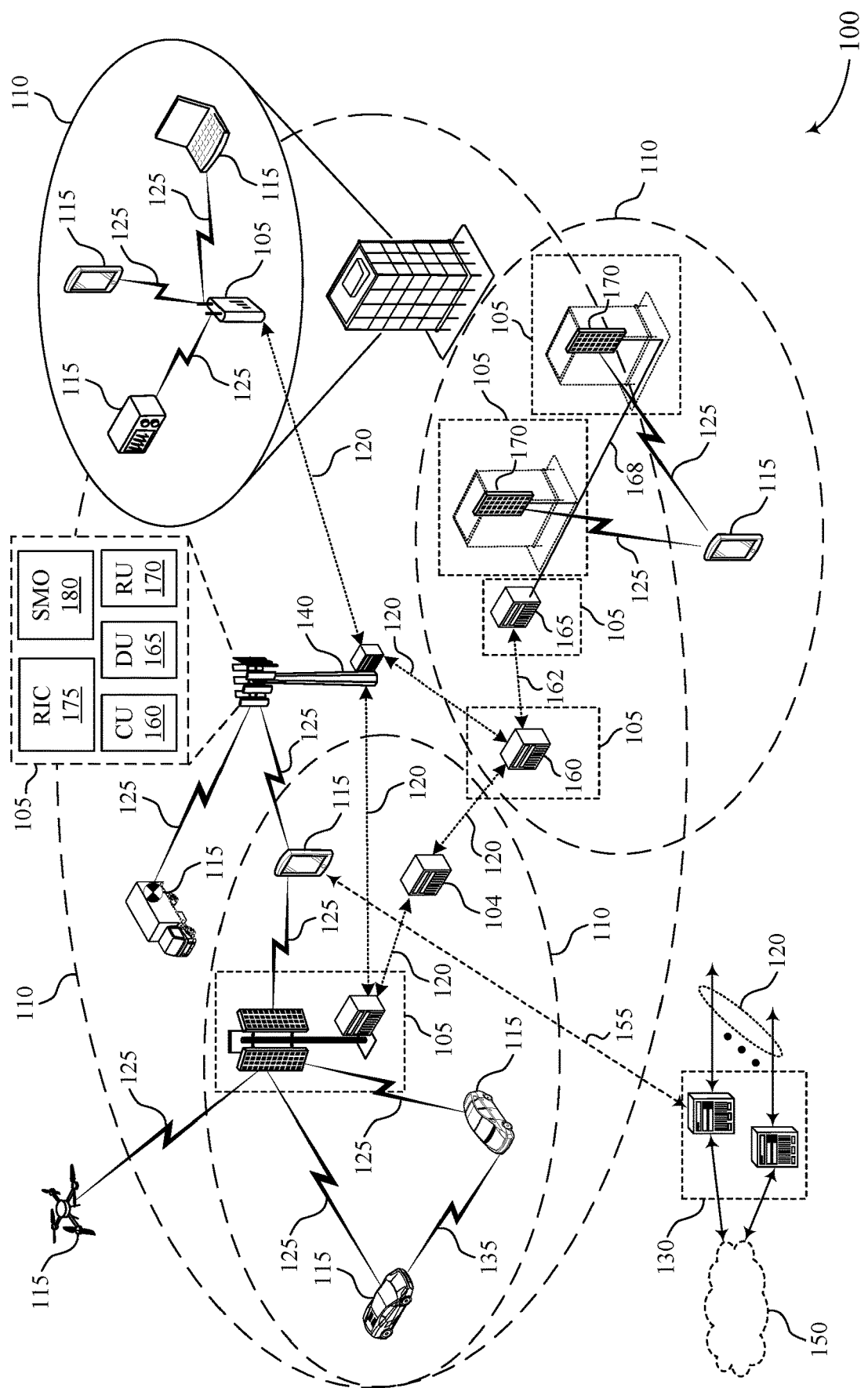
FIG. 1 illustrates an example of a wireless communications system that supports demodulation reference signal sharing across user equipments (UEs) supporting over the air (OTA) digital pre-distortion (DPD) in accordance with one or more aspects of the present disclosure.

In some wireless communications systems, a network entity may use one or more power amplifiers (PAs) to generate and send communications for one or more user equipments (UEs). The PAs may amplify the power of transmissions from the network entity non-linearly, which may limit an achievable signal to noise ratio (SNR) and therefore may limit an attainable data rate of the system. To mitigate such impairments, the network entity may apply a digital pre-distortion (DPD) to a downlink shared channel by estimating a non-linearity (NL) impairment and implementing a NL compensation function to address estimated NO impairments to transmitted signals. However, applying the DPD may be a complex process, and performing DPD for every PA at each transmission antenna at the network entity may be costly and may rely on a complex radio frequency (RF) feedback chain. Thus, to mitigate the cost, a NL compensation estimation may instead by performed by the UEs. In some examples, the UEs may both estimate NL compensation function coefficients and apply the NL compensation function (e.g., in the example of digital post-distortion (DPoD)). In some examples, the UEs may indicate the estimated NL compensation coefficients to the network entity and the network entity may apply the NL compensation function (e.g., in the example of over the air (OTA) DPD). However, both DPoD and OTA DPD procedures may rely on the UEs being able to identify (e.g., have access to) a full reference signal being transmitted by the network entity via the frequency range of various UEs (e.g., as a function of time x(t)). In the case of frequency division multiplexing (FDM), multiple UEs may transmit and receive signals in a same time duration (e.g., a slot) at different frequencies, and therefore the multiple UEs may not have access to a full demodulation reference signal (DMRS) pattern spanning a full frequency band (e.g., the UE may not receive or measure portions of DMRS signaling transmitted via frequency bands or subbands allocated to other frequency division multiplexed (FDMed) UEs).

Accordingly, techniques described herein may support OTA DPD for a group of FDMed UEs. A network entity may share a full DMRS pattern with multiple FDMed UEs. For example, a group of UEs may be configured with a DMRS codebook including multiple DMRS symbol patterns. The network entity may indicate, to the UEs, an index corresponding to a DMRS symbol pattern in the DMRS codebook. Based on the indicated DMRS symbol pattern, the UEs may evaluate the non-linear impairment by estimating NL compensation function coefficients (e.g., across the full DMRS pattern spanning a full frequency band or multiple subbands, as opposed to just the band or subband allocated to the individual FDMed UE). Each of the UEs may indicate, to the network entity, their estimated NL compensation function coefficients. The network entity may average the NL compensation function coefficients (e.g., by computing a weighted average based on an SNR of each UE), apply an updated compensation function based on the NL compensation function coefficients for the various UEs (e.g., apply DPD using the coefficients), and transmit a downlink transmission according to an updated compensation function.

Aspects of the disclosure are initially described in the context of wireless communications systems. Aspects of the disclosure are further illustrated by and described with reference to wireless communications systems and process flows. Aspects of the disclosure are further illustrated by and described with reference to apparatus diagrams, system diagrams, and flowcharts that relate to demodulation reference signal sharing across user equipments (UEs) supporting OTA DPD.

FIG. 1 illustrates an example of a wireless communications system 100 that supports demodulation reference signal sharing across user equipments (UEs) supporting OTA DPD in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104. In the case of the techniques described herein applied in the context of a disaggregated RAN architecture, one or more components of the disaggregated RAN architecture may be configured to support demodulation reference signal sharing across user equipments (UEs) supporting OTA DPD as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_S=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHZ, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body. The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices. Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval. A network entity 105 may share a full DMRS pattern with multiple FDMed UEs 115. Based on the shared DMRS pattern, the UEs 115 may evaluate the non-linear impairment by estimating NL compensation function coefficients. Each of the UEs 115 may indicate, to the network entity 105, their estimated NL compensation function coefficients. The network entity 105 may average the NL compensation function coefficients, apply an updated compensation function based on the NL compensation function coefficients for the various UEs 115 (e.g., apply DPD using the coefficients), and transmit a downlink transmission according to the updated compensation function.

Figure 2:
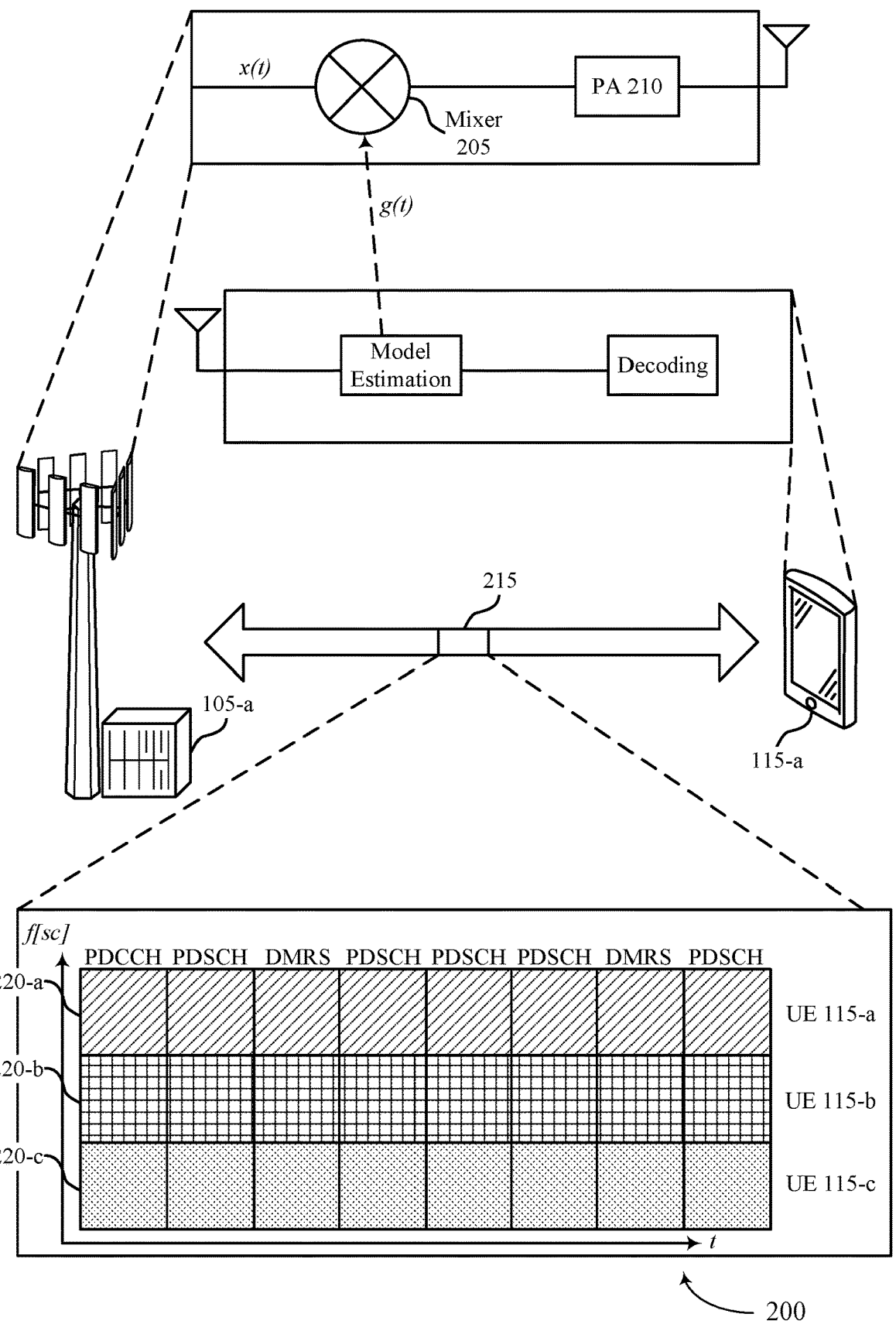
FIG. 2 illustrates an example of a wireless communications system that supports demodulation reference signal sharing across UEs supporting OTA DPD in accordance with one or more aspects of the present disclosure.

FIG. 2 illustrates an example of a wireless communications system 200 that supports demodulation reference signal sharing across UEs supporting OTA DPD in accordance with one or more aspects of the present disclosure. The wireless communications system 200 may implement aspects of or may be implemented by aspects of the wireless communications system 100. For example, the wireless communications system 200 may include a UE 115 (e.g., a UE 115-a) and a network entity 105 (e.g., a network entity 105-a), which may be examples of the corresponding devices as described with reference to FIG. 1.

In some wireless communications systems, a network entity 105-a may use one or more PAs 210 in communications with one or more UEs 115. The PAs 210 may amplify the power of transmissions from the network entity 105-a non-linearly, which may be a radio frequency (RF) impairment which may limit an achievable SNR and therefore may limit an attainable data rate of the system. To mitigate this impairment, the network entity 105-a may apply a DPD to a physical downlink shared channel (PDSCH) by estimating an NL correction function. However, applying the DPD may be a complex process, and performing DPD for every PA 210 at each transmission antenna at the network entity 105-a may be costly. Thus, to mitigate the cost, the wireless communications system may perform an OTA DPD wherein a NL compensation function estimation may instead by performed by the UEs 115 to estimate NL compensation function coefficients (e.g., PA coefficients) for a non-linear impairment compensation function g(x). The UEs 115 may indicate the NL compensation function coefficients to the network entity 105-a and the network entity 105-a may apply the non-linear impartment compensation function g(x) via a mixer 205. However, OTA DPD may rely on the UEs 115 being able to identify (e.g., have access to) a full signal being transmitted by the network entity 105 (e.g., as a function of time x(t)).

In the case of FDM communications, multiple UEs 115 may transmit and receive signals in a same time duration (e.g., a slot) at different frequencies. In the example of an FDM slot 215, a group of FDMed UEs including a UE 115-a, a UE 115-b, and a UE 115-c may receive signals in a frequency subband 220-a, a frequency subband 220-b, and a frequency subband 220-c, respectively. The UE 115-a may have access to a DMRS pattern corresponding to the frequency subband 220-a such that it can receive signals including physical downlink control channels (PDCCHs), PDSCHs, and DMRSs in the frequency subband 220-a. However, the UE 115-a, the UE 115-b, and the UE 115-c may not have access to a portion of the DMRS pattern corresponding to frequency subbands allocated to the other UEs 115. The network entity 105-a may transmit a pilot or broadcast signal that is not FDMed (e.g., that is split between the different UEs 115 via the frequency subband 220 such that the entire pilot is fully shared between different users respectively), and the UEs 115 may each estimate the NL compensation coefficients based on the pilot signal. However, such techniques may cause additional overhead and may rely on a modification to the downlink FDM slot 215. Additionally, such techniques may not allow NL compensation coefficient estimation in every slot.

Accordingly, techniques described herein may support OTA DPD for the group of FDMed UEs 115. The network entity 105-a may share (e.g., via a downlink control information (DCI) in a PDCCH) a full DMRS pattern with the group of FDMed UEs 115. Thus, each UE 115 will be able to estimate the network entity 105-a PA model. Model coefficients may be sent from the UE 115-a over the uplink to the network entity 105-a and the network entity 105-a may apply the inverse model prior to applying the PA 210, to mitigate the NL influence according to the indicated coefficients. For example, the UE 115-a, the UE 115-b, and the UE 115-c may each be configured (e.g., radio resource control (RRC) configured) with a DMRS codebook including multiple DMRS symbol patterns. The network entity 105-a may indicate, via the DCI and to each of the UEs 115, an index corresponding to a DMRS symbol pattern in the DMRS codebook.

In an initial state (e.g., an aging scenario, a time-out scenario, a power reset scenario, or the like), the NL impairment at the network entity 105-a may remain untreated. Thus, the initial compensation function may be in an initial state (e.g., with an NL compensation function g(x)=1). The network entity 105-a may transmit, to the UE 115-a, the UE 115-b, and the UE 115-c, the DMRS according to the indicated DMRS symbol pattern without applying any NL compensation (e.g., with an NL compensation function g(x)=1). In that slot (e.g., with the NL compensation in the initial state), the rate used by the network entity 105-a for downlink transmissions may be lower due to the uncorrected NDL impairments, in which case, the network entity 105-a may select a lower modulation and coding scheme (MCS), a lower code rate, or both. In downlink slots, an entire DMRS symbol pattern may be shared such that each UE 115 has access to the DMRS pattern spanning all of the subbands 220. The network entity 105-a may choose a DMRS pattern from the codebook and share the index indicating the chosen DMRS pattern in a PDDCH message.

Each of the UEs 115 may evaluate residual NL impairment by estimating PA model coefficients. For example, each UE 115 may observe a signal which may be described according to Equation 1 (e.g., or, equivalently, Equation 2) as follows:

$$y(t) = h(t) * \underbrace{\left( x(t) + \sum_{i \in NL_{KERNEL}} \alpha_i x^i(t) \right)}_{\text{the compressed signal}} + n(t) \quad (1)$$

$$y(t) = h(t) * x(t) + \left[ \sum_{i \in NL_{KERNEL}} \alpha_i \cdot h(t) * x^i(t) \right] + n(t) \quad (2)$$

As described with reference to Equation 1 (e.g., and Equation 2), the observed time-domain signal y(t) may depend on the time-domain DMRS transmitted by the network entity 105-a x(t), a time-domain downlink channel h(t), a time-domain added Gaussian white noise (AGWN) function n(t), and the set of NL compensation coefficients $\alpha_1$, where "*" may be a convolution operator.

Based on the received DMRS y(t) and the indicated DMRS symbol pattern x(t), the UE 115-a, the UE 115-b, and the UE 115-c may each evaluate a non-linear impairment by estimating NL compensation function coefficients $\{\hat{\alpha}_i\}$ (e.g., across the full DMRS pattern spanning a full frequency band or multiple subbands 220). The UEs 115 may additionally estimate the downlink channel $\hat{h}(t)$ via an iterative estimation process. For example, because the channel may also be estimated assisted by the DMRS channel, the UEs 115 may perform an iterative estimation process to estimate both h(t) and $\{\hat{\alpha}_i\}$.

Each of the UEs 115 may share estimated coefficients via uplink signaling (e.g., via PUCCH or PUSCH signaling). For example, the UE 115 may indicate (e.g., via data signaling in a physical uplink shared channel (PUSCH) or via an uplink control information (UCI) in a physical uplink control channel (PUCCH)), to the network entity 105-a, the estimated NL compensation function coefficients $\{\hat{\alpha}_i\}$. The network entity 105-a may receive the NL compensation function coefficients and generate a PA model using an average of the received NL compensation function coefficients. For example, the network entity 105-a may compute a weighted average of the received NL compensation coefficients according to a quality metric (e.g., a reported SNR from each of the UEs 115). The PA model may be described according to Equation 3.

$$PA_{model_i}(x(t)) = x(t) + \sum_{i \in NL_{KERNEL}} \hat{\alpha}_i x^i(t) \qquad (3)$$

The network entity 105-a may calculate the PA model according to Equation 3, and may update the NL compensation function g(x) according to the estimated PA model. The updated compensation function may be described according to Equation 4.

$$g_i(x) = g_{i-1}(x) \cdot \left(PA_{model_i}(x)\right)^{-1} \qquad (4)$$

The network entity 105-a may transmit a downlink transmission according to the updated NL compensation function g(x).

Figure 3:
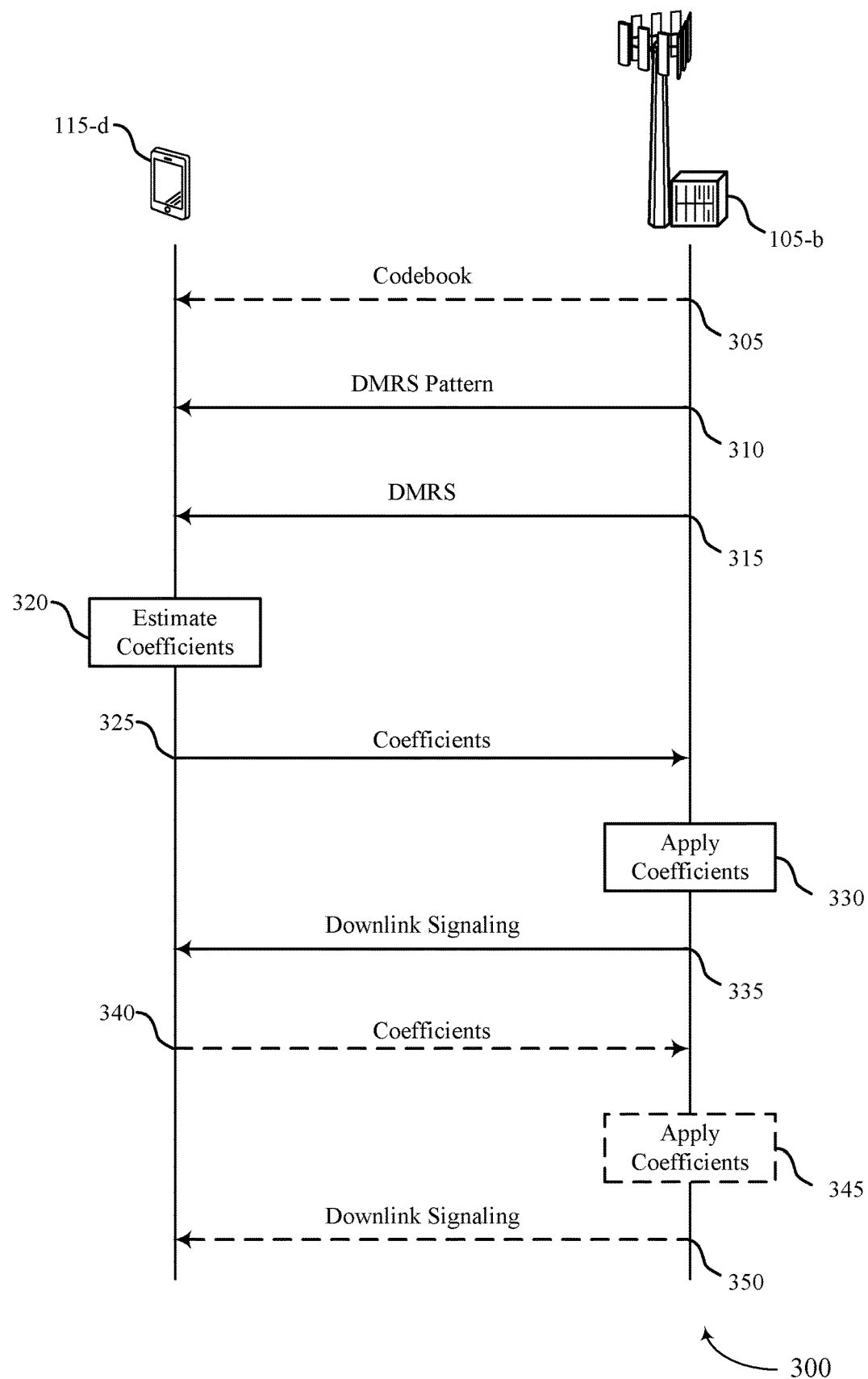
FIG. 3 illustrates an example of a process flow that supports demodulation reference signal sharing across UEs supporting OTA DPD in accordance with one or more aspects of the present disclosure.

FIG. 3 illustrates an example of a process flow 300 that supports demodulation reference signal sharing across UEs supporting OTA DPD in accordance with one or more aspects of the present disclosure. The process flow 300 may implement aspects of or may be implemented by aspects of the wireless communications system 100 and the wireless communications system 200. For example, the wireless communications system 200 may include a UE 115 (e.g., a UE 115-d) and a network entity 105 (e.g., a network entity 105-b), which may be examples of the corresponding devices as described with reference to FIGS. 1 and 2.

In some cases, at 305, the network entity 105-b may transmit, to the UE 115-d, an indication of a codebook including a set of one or more candidate DMRS patterns. For example, the codebook may include multiple of DMRS patterns spanning multiple frequency subbands allocated to a multiple of FDMed UEs, including the UE 115-d. Each of the candidate DMRS patterns in the codebook may correspond to a unique DMRS pattern index. The network entity 105-b may configure the multiple UEs including the UE 115-d with the codebook via RRC signaling.

At 310, the network entity 105-b may transmit, to the UE 115-d, control signaling indicating one DMRS pattern. In some examples, the control signaling may indicate the DMRS pattern from the multiple candidate DMRS patterns indicated in the codebook provided at 305. For example, the control signaling may include an index indicating the DMRS pattern from the codebook. In some examples, the DMRS pattern indicated at 310 may be individually configured (e.g., the entire pattern may be indicated without reference to candidate DMRS patterns, as opposed to an index referencing candidate DMRS patterns).

The control signaling received at 310 (e.g., or different control signaling) may additionally allocate one subband of the multiple frequency subbands for the UE 115-d to use in communication with the network entity 105-b. In some examples, the network entity 105-b may additionally transmit control signaling to a second one of the multiple UEs including the index indicating the DMRS pattern and a second subband of the multiple frequency subbands for the second UE to use in communication with the network entity 105-b. The network entity 105-b may transmit the control signaling via a DCI message, or via a PDSCH.

At 315, the network entity 105-b may transmit, to the UEs including the UE 115-d and the second UE, one or more DMRSs according to the indicated DMRS pattern (e.g., without applying an NL impairment compensation function). That is, the multiple UEs including the UE 115-d and the second UE may monitor one or more of the multiple frequency subbands for the one or more DMRSs. The UE 115-d and the second UE may perform one or more measurements for the multiple frequency subbands during a symbol period allocated for DMRSs according to the indicated DMRS pattern. The one or more measurements may include, for example, estimating a channel quality based on the indicated DMRS pattern. In some examples, the UE 115-d (e.g., and the second UE) may monitor or perform measurements during a DMRS symbol across the entire band or across multiple subbands (e.g., outside of the subband allocated to the UE 115-d), instead of merely monitoring for the DMRSs via the subband allocated to the UE 115-d, according to the DMRS pattern indicated at 310.

At 320, the UE 115-d may estimate a set of PA coefficient values associated with an NL impairment compensation function (e.g., performed by the network entity 105-b for downlink signaling to address PA NL impairment introduced by PAs at the network entity 105-b). For example, the UE 115-d may detect residual NL impairments to an observed signal (e.g., associated with at least one of the one or more DMRSs). The UE 115-d may estimate the PA coefficient values based on the residual NL impairments (e.g., and the one or more measurements). The second UE may estimate a second set of PA coefficient values (e.g., based on residual NL impairments and the one or more measurements).

At 325, the UE 115-d may transmit, to the network entity 105-b, the set of PA coefficient values associated with the NL impairment compensation function. The second UE may transmit, to the network entity 105-b, the second set of PA coefficient values associated with the NL impairment compensation function. For example, UE 115-d and the second UE may transmit the set of PA coefficient values and the second set of PA coefficient values, respectively, to the network entity 105-d via a PUSCH or a PUCCH (e.g., via a UCI message). The UE 115-d and the second UE may each additionally report to the network entity 105-b a channel quality (e.g., a SNR associated with the PDSCH or the PDCCH).

At 330, the network entity 105-b may apply the set of PA coefficient values by updating the NL impairment compensation function. For example, the network entity 105-b may combine the set of PA coefficient values and the second set of PA coefficient values (e.g., by computing a weighted average based on the reported SNR) and update the NL impairment compensation function based on the combining.

At 335, the network entity 105-b may transmit, to the UE 115-d, downlink signaling based on the set of PA coefficient values. For example, the network entity 105-b may apply the updated NL impairment compensation function to the downlink signaling. In some cases, the UE 115-d may receive the downlink signaling and detect an updated residual NL impairment associated with the downlink signaling. The updated residual NL impairment may be less than the residual NL impairment detected based on the DMRS.

In some cases, at 340, the UE 115-d may estimate and transmit, to the network, an additional set of PA coefficient values associated with the NL impairment compensation function. The UE may estimate the additional set of PA coefficient values based on the updated NL impairment associated with the downlink signaling.

In some cases, at 345, the network entity 105-*b* may update the NL impairment compensation function based on the updated set of PA coefficient values. In some cases, at 350, the network entity 105-*b* may transmit additional downlink signaling based on the updated NL impairment compensation function. In some cases, the UE 115-*d* may iteratively estimate coefficients and report coefficients over time (e.g., periodically, or until the NL impairment satisfies a threshold, among other examples).

Figure 4:
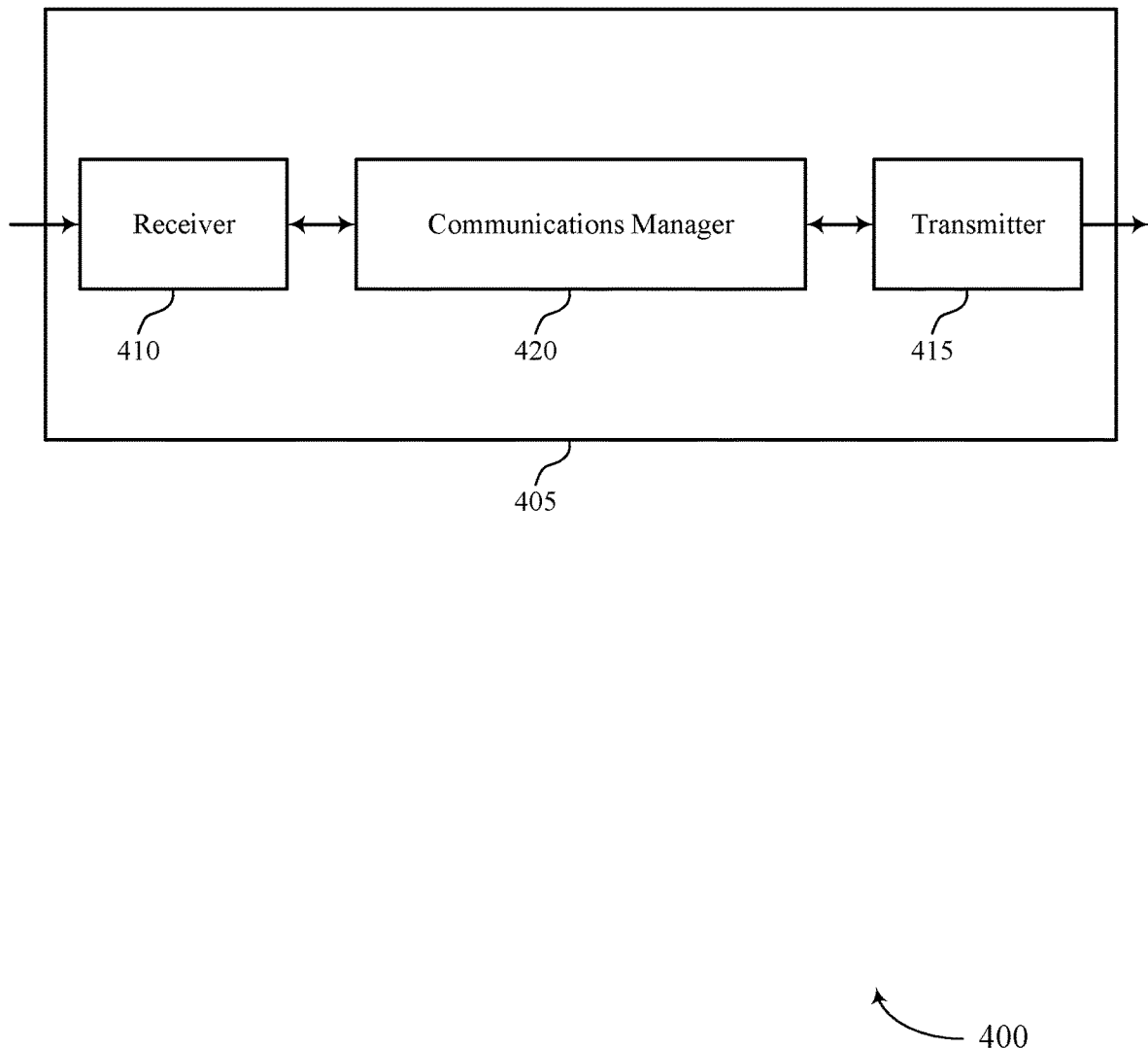
FIGS. 4 and 5 illustrate block diagrams of devices that support demodulation reference signal sharing across UEs supporting OTA DPD in accordance with one or more aspects of the present disclosure.

FIG. 4 illustrates a block diagram 400 of a device 405 that supports demodulation reference signal sharing across UEs supporting OTA DPD in accordance with one or more aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to demodulation reference signal sharing across UEs supporting OTA DPD). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to demodulation reference signal sharing across UEs supporting OTA DPD). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of demodulation reference signal sharing across UEs supporting OTA DPD as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communications at a UE in accordance with examples as disclosed herein. For example, the communications manager 420 may be configured as or otherwise support a means for receiving, from a network entity, control signaling indicating a demodulation reference signal pattern associated with a set of frequency resources, where a set of multiple subsets of the set of frequency resources are allocated to respective UEs of a set of UEs including the UE. The communications manager 420 may be configured as or otherwise support a means for transmitting a set of power amplifier coefficient values associated with a non-linear impairment compensation function based on the demodulation reference signal pattern. The communications manager 420 may be configured as or otherwise support a means for receiving downlink signaling based on the set of power amplifier coefficient values.

By including or configuring the communications manager 420 in accordance with examples as described herein, the device 405 (e.g., a processor controlling or otherwise coupled with the receiver 410, the transmitter 415, the communications manager 420, or a combination thereof) may support techniques for reduced processing and more efficient utilization of communication resources.

Figure 5:
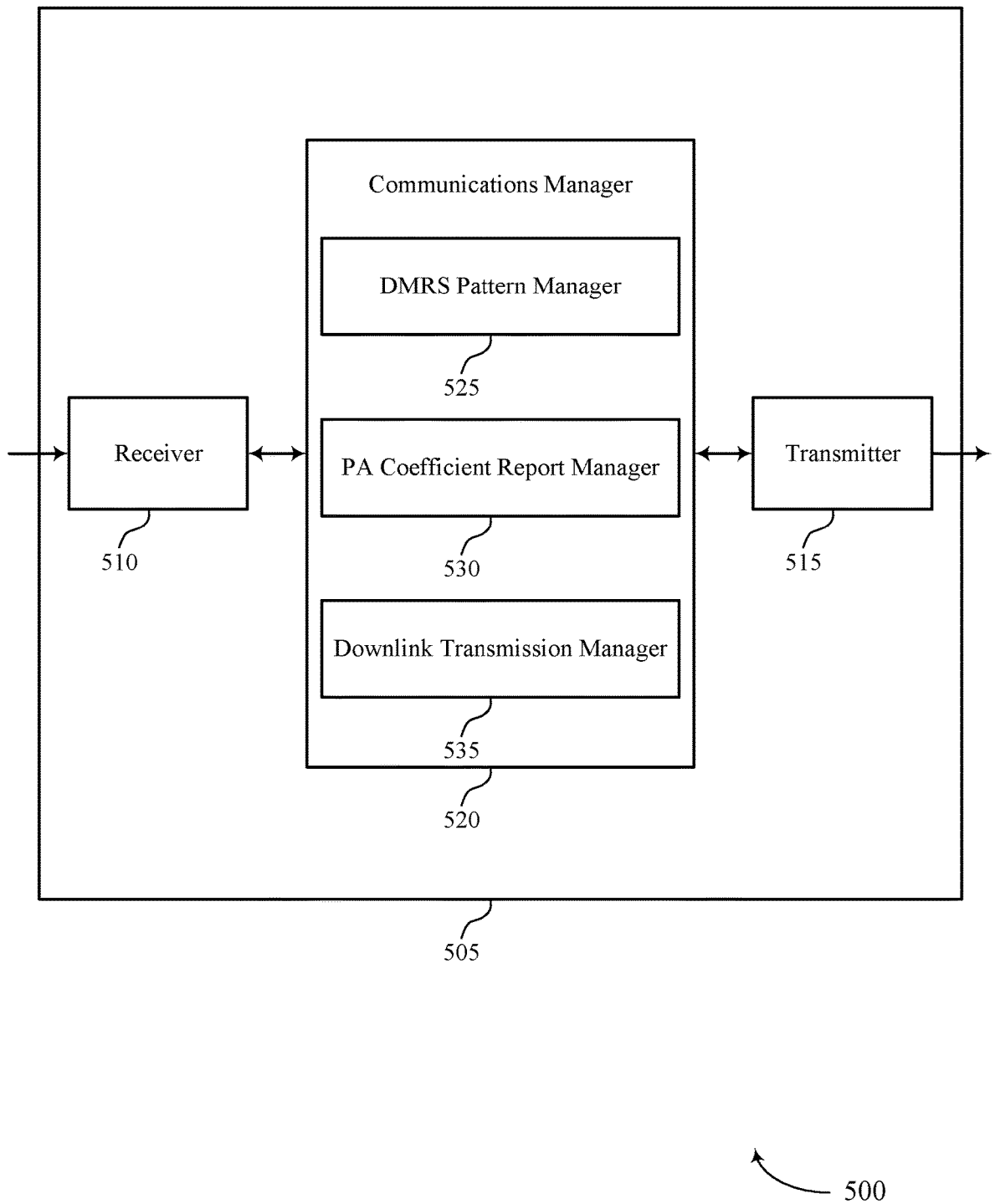

FIG. 5 illustrates a block diagram 500 of a device 505 that supports demodulation reference signal sharing across UEs supporting OTA DPD in accordance with one or more aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to demodulation reference signal sharing across UEs supporting OTA DPD). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to demodulation reference signal sharing across UEs supporting OTA DPD). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of demodulation reference signal sharing across UEs supporting OTA DPD as described herein. For example, the communications manager 520 may include a DMRS Pattern Manager 525, a PA Coefficient Report Manager 530, a Downlink Transmission Manager 535, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a UE in accordance with examples as disclosed herein. The DMRS Pattern Manager 525 may be configured as or otherwise support a means for receiving, from a network entity, control signaling indicating a demodulation reference signal pattern associated with a set of frequency resources, where a set of multiple frequency subsets of the set of frequency resources are allocated to respective UEs of a set of UEs including the UE. The PA Coefficient Report Manager 530 may be configured as or otherwise support a means for transmitting a set of power amplifier coefficient values associated with a non-linear impairment compensation function based on the demodulation reference signal pattern. The Downlink Transmission Manager 535 may be configured as or otherwise support a means for receiving downlink signaling based on the set of power amplifier coefficient values.

Figure 6:
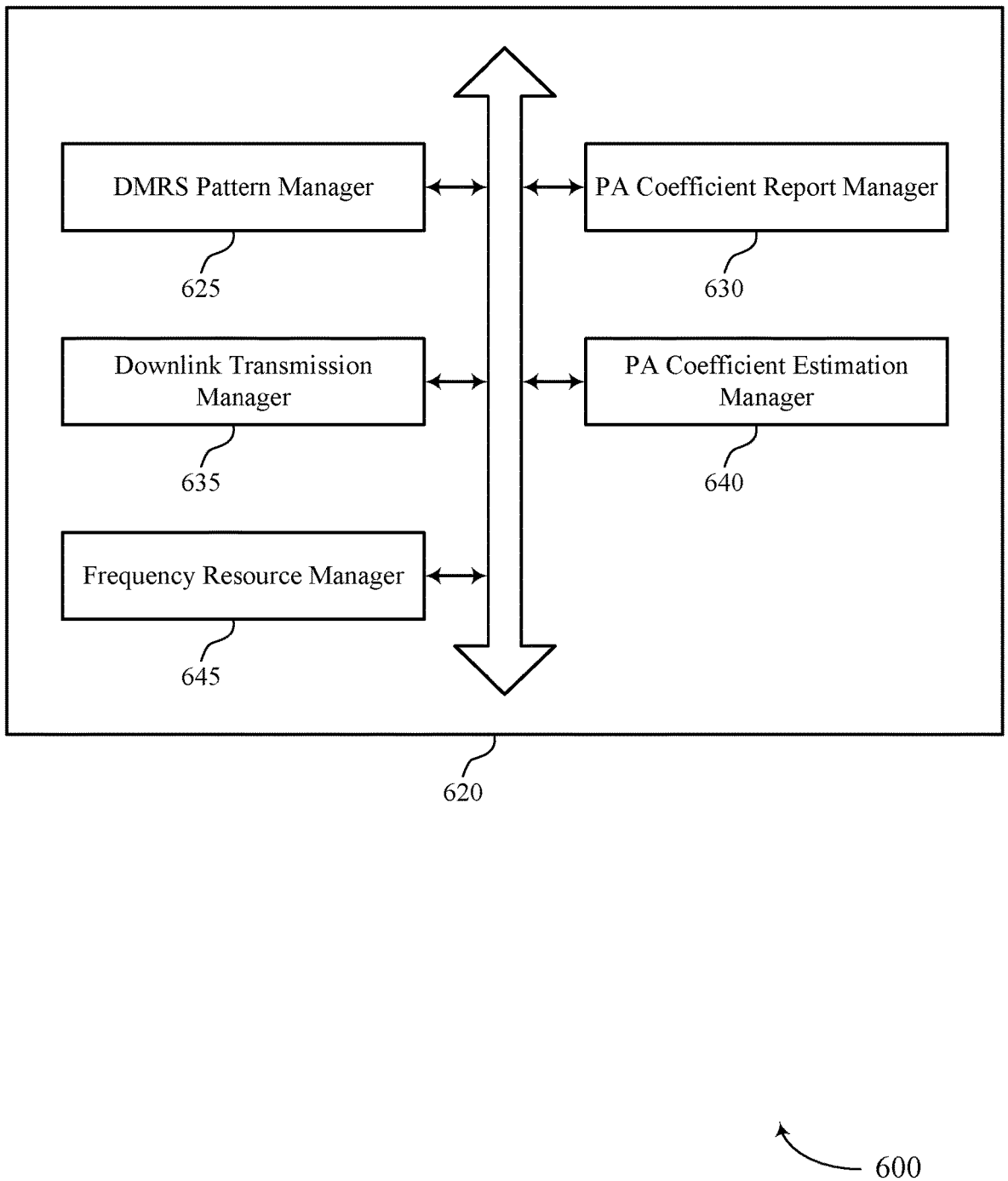
FIG. 6 illustrates a block diagram of a communications manager that supports demodulation reference signal sharing across UEs supporting OTA DPD in accordance with one or more aspects of the present disclosure.

FIG. 6 illustrates a block diagram 600 of a communications manager 620 that supports demodulation reference signal sharing across UEs supporting OTA DPD in accordance with one or more aspects of the present disclosure. The communications manager 620 may be an example of aspects of a communications manager 420, a communications manager 520, or both, as described herein. The communications manager 620, or various components thereof, may be an example of means for performing various aspects of demodulation reference signal sharing across UEs supporting OTA DPD as described herein. For example, the communications manager 620 may include a DMRS Pattern Manager 625, a PA Coefficient Report Manager 630, a Downlink Transmission Manager 635, a PA Coefficient Estimation Manager 640, a Frequency Resource Manager 645, or any combination thereof. Each of these components may communicate, directly or indirectly, with one another (e.g., via one or more buses).

The communications manager 620 may support wireless communications at a UE in accordance with examples as disclosed herein. The DMRS Pattern Manager 625 may be configured as or otherwise support a means for receiving, from a network entity, control signaling indicating a demodulation reference signal pattern associated with a set of frequency resources, where a set of multiple subsets of the set of frequency resources are allocated to respective UEs of a set of UEs including the UE. The PA Coefficient Report Manager 630 may be configured as or otherwise support a means for transmitting a set of power amplifier coefficient values associated with a non-linear impairment compensation function based on the demodulation reference signal pattern. The Downlink Transmission Manager 635 may be configured as or otherwise support a means for receiving downlink signaling based on the set of power amplifier coefficient values.

In some examples, the DMRS Pattern Manager 625 may be configured as or otherwise support a means for receiving, during a symbol period of a first slot, one or more demodulation reference signals according to the demodulation reference signal pattern. In some examples, the PA Coefficient Estimation Manager 640 may be configured as or otherwise support a means for estimating the set of power amplifier coefficient values based on detecting residual non-linear impairments to an observed signal including the one or more demodulation reference signals spanning the set of frequency resources according to the demodulation reference signal pattern.

In some examples, the Frequency Resource Manager 645 may be configured as or otherwise support a means for receiving control signaling allocating one subset of the set of frequency resources for wireless communications by the UE. In some examples, the Downlink Transmission Manager 635 may be configured as or otherwise support a means for monitoring the set of frequency resources for downlink communications during one or more symbol periods of a slot, where receiving the one or more demodulation reference signals is based on the monitoring. In some examples, the PA Coefficient Estimation Manager 640 may be configured as or otherwise support a means for performing one or more measurements for the set of frequency resources during a symbol period allocated for demodulation reference signals according to the demodulation reference signal pattern, where estimating the set of power amplifier coefficient values is based on the monitoring.

In some examples, the DMRS Pattern Manager 625 may be configured as or otherwise support a means for receiving, from the network entity, an indication of a codebook including a set of multiple candidate demodulation reference signal patterns, where receiving the control signaling indicating the demodulation reference signal pattern includes receiving an index indicating one of the set of multiple candidate demodulation reference signal patterns.

In some examples, the PA Coefficient Estimation Manager 640 may be configured as or otherwise support a means for estimating a channel quality based on the demodulation reference signal pattern, where the set of power amplifier coefficient values are based on the estimated channel quality.

In some examples, the DMRS Pattern Manager 625 may be configured as or otherwise support a means for detecting an initial residual non-linear impairment to a first observed signal associated with one or more demodulation reference signals received according to the demodulation reference signal pattern. In some examples, the Downlink Transmission Manager 635 may be configured as or otherwise support a means for detecting an updated residual non-linear impairment to a second observed signal associated with the downlink signaling, where the updated residual non-linear impairment to the second observed signal is less than the initial residual non-linear impairment to the first observed signal based on the set of power amplifier coefficient values.

Figure 7:
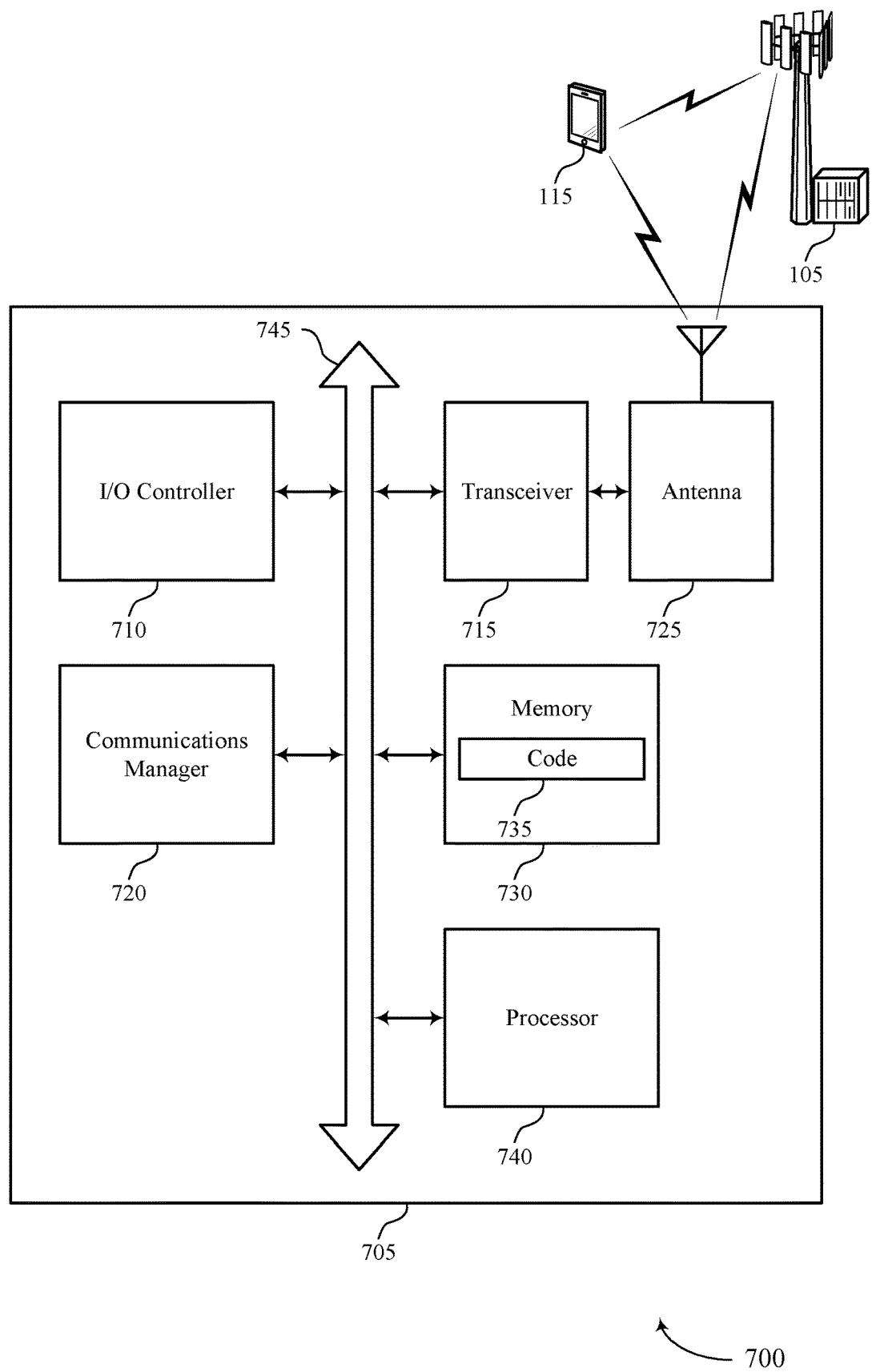
FIG. 7 illustrates a diagram of a system including a device that supports demodulation reference signal sharing across UEs supporting OTA DPD in accordance with one or more aspects of the present disclosure.

FIG. 7 illustrates a diagram of a system 700 including a device 705 that supports demodulation reference signal sharing across UEs supporting OTA DPD in accordance with one or more aspects of the present disclosure. The device 705 may be an example of or include the components of a device 405, a device 505, or a UE 115 as described herein. The device 705 may communicate (e.g., wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting demodulation reference signal sharing across UEs supporting OTA DPD). For example, the device 705 or a component of the device 705 may include a processor 740 and memory 730 coupled with or to the processor 740, the processor 740 and memory 730 configured to perform various functions described herein.

The communications manager 720 may support wireless communications at a UE in accordance with examples as disclosed herein. For example, the communications manager 720 may be configured as or otherwise support a means for receiving, from a network entity, control signaling indicating a demodulation reference signal pattern associated with a set of frequency resources, where a set of multiple subsets of the set of frequency resources are allocated to respective UEs of a set of UEs including the UE. The communications manager 720 may be configured as or otherwise support a means for transmitting a set of power amplifier coefficient values associated with a non-linear impairment compensation function based on the demodulation reference signal pattern. The communications manager 720 may be configured as or otherwise support a means for receiving downlink signaling based on the set of power amplifier coefficient values.

By including or configuring the communications manager 720 in accordance with examples as described herein, the device 705 may support techniques for improved user experience related to reduced processing and improved utilization of processing capability.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of demodulation reference signal sharing across UEs supporting OTA DPD as described herein, or the processor 740 and the memory 730 may be otherwise configured to perform or support such operations.

Figure 8:
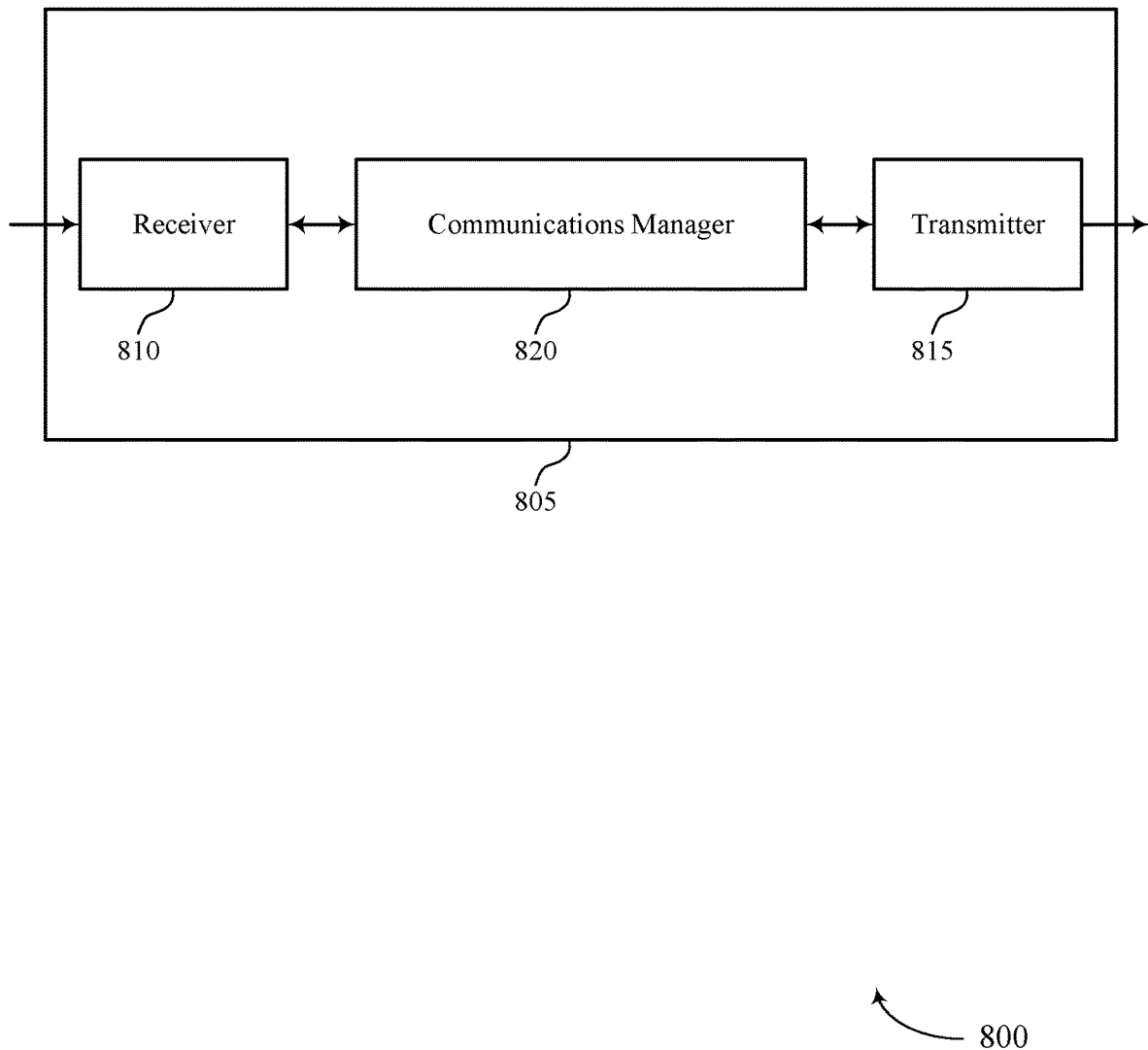
FIGS. 8 and 9 illustrate block diagrams of devices that support demodulation reference signal sharing across UEs supporting OTA DPD in accordance with one or more aspects of the present disclosure.

FIG. 8 illustrates a block diagram 800 of a device 805 that supports demodulation reference signal sharing across UEs supporting OTA DPD in accordance with one or more aspects of the present disclosure. The device 805 may be an example of aspects of a network entity 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations thereof or various components thereof may be examples of means for performing various aspects of demodulation reference signal sharing across UEs supporting OTA DPD as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a network entity in accordance with examples as disclosed herein. For example, the communications manager 820 may be configured as or otherwise support a means for transmitting, to a UE, control signaling indicating a demodulation reference signal pattern associated with a set of frequency resources, where a set of multiple subsets of the set of frequency resources are allocated to respective UEs of a set of frequency-division multiplexed UEs including the UE. The communications manager 820 may be configured as or otherwise support a means for receiving, from the UE, a set of power amplifier coefficient values associated with a non-linear impairment compensation function based on the demodulation reference signal pattern. The communications manager 820 may be configured as or otherwise support a means for transmitting, to the UE, downlink signaling based on the set of power amplifier coefficient values.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for NL impairment compensation and coefficient reporting resulting in reduced processing, more reliable wireless communications, more efficient utilization of communication resources, and improved user experience.

Figure 9:
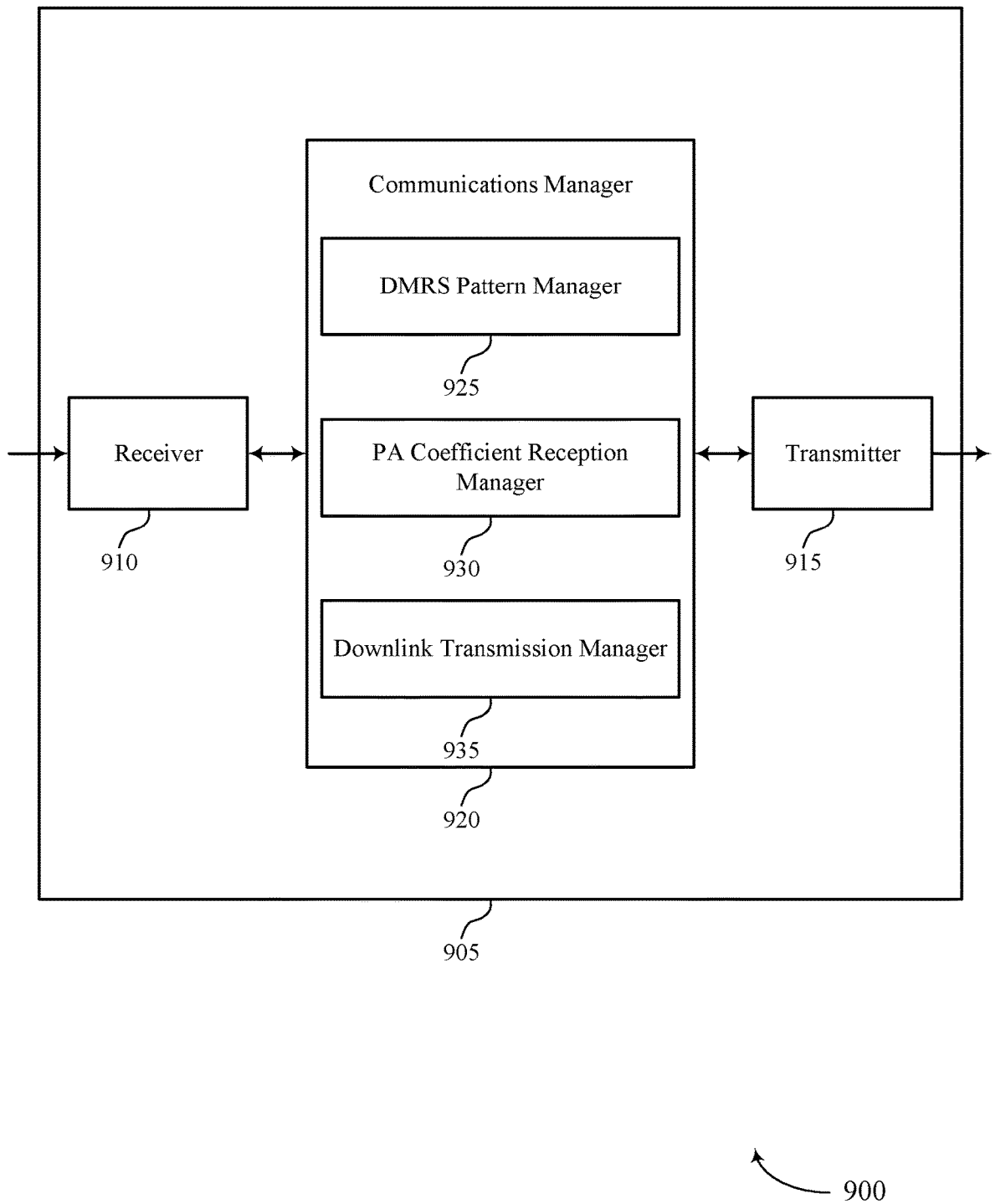

FIG. 9 illustrates a block diagram 900 of a device 905 that supports demodulation reference signal sharing across UEs supporting OTA DPD in accordance with one or more aspects of the present disclosure. The device 905 may be an example of aspects of a device 805 or a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of demodulation reference signal sharing across UEs supporting OTA DPD as described herein. For example, the communications manager 920 may include a DMRS Pattern Manager 925, a PA Coefficient Reception Manager 930, a Downlink Transmission Manager 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a network entity in accordance with examples as disclosed herein. The DMRS Pattern Manager 925 may be configured as or otherwise support a means for transmitting, to a UE, control signaling indicating a demodulation reference signal pattern associated with a set of frequency resources, where a set of multiple subsets of the set of frequency resources are allocated to respective UEs of a set of frequency-division multiplexed UEs including the UE. The PA Coefficient Reception Manager 930 may be configured as or otherwise support a means for receiving, from the UE, a set of power amplifier coefficient values associated with a non-linear impairment compensation function based on the demodulation reference signal pattern. The Downlink Transmission Manager 935 may be configured as or otherwise support a means for transmitting, to the UE, downlink signaling based on the set of power amplifier coefficient values.

Figure 10:
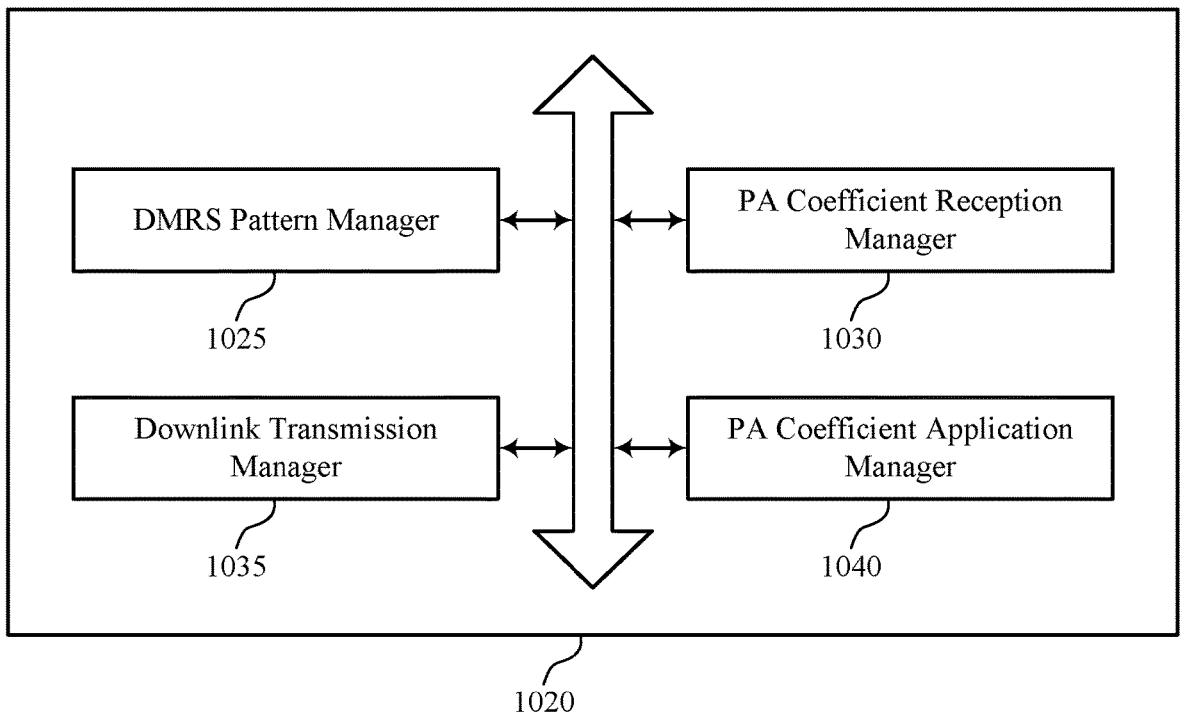
FIG. 10 illustrates a block diagram of a communications manager that supports demodulation reference signal sharing across UEs supporting OTA DPD in accordance with one or more aspects of the present disclosure.

FIG. 10 illustrates a block diagram 1000 of a communications manager 1020 that supports demodulation reference signal sharing across UEs supporting OTA DPD in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of demodulation reference signal sharing across UEs supporting OTA DPD as described herein. For example, the communications manager 1020 may include a DMRS Pattern Manager 1025, a PA Coefficient Reception Manager 1030, a Downlink Transmission Manager 1035, a PA Coefficient Application Manager 1040, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communications at a network entity in accordance with examples as disclosed herein. The DMRS Pattern Manager 1025 may be configured as or otherwise support a means for transmitting, to a UE, control signaling indicating a demodulation reference signal pattern associated with a set of frequency resources, where a set of multiple subsets of the set of frequency resources are allocated to respective UEs of a set of frequency-division multiplexed UEs including the UE. The PA Coefficient Reception Manager 1030 may be configured as or otherwise support a means for receiving, from the UE, a set of power amplifier coefficient values associated with a non-linear impairment compensation function based on the demodulation reference signal pattern. The Downlink Transmission Manager 1035 may be configured as or otherwise support a means for transmitting, to the UE, downlink signaling based on the set of power amplifier coefficient values.

In some examples, the DMRS Pattern Manager 1025 may be configured as or otherwise support a means for transmitting, to the UE, an indication of a codebook including a set of multiple candidate demodulation reference signal patterns, where transmitting the control signaling indicating the demodulation reference signal pattern includes transmitting an index indicating one of the candidate demodulation reference signal patterns.

In some examples, the DMRS Pattern Manager 1025 may be configured as or otherwise support a means for transmitting one or more demodulation reference signals during a symbol of a first slot without applying the non-linear impairment compensation function. In some examples, the PA Coefficient Application Manager 1040 may be configured as or otherwise support a means for updating the non-linear impairment compensation function according to the set of power amplifier coefficient values, where transmitting the downlink signaling is based on applying the updated non-linear impairment compensation function.

In some examples, the DMRS Pattern Manager 1025 may be configured as or otherwise support a means for transmitting, to a second UE of the set of UEs, control signaling indicating the demodulation reference signal pattern associated with the set of frequency resources, where the UE is allocated a first subset of the set of frequency resources and the second UE is allocated a second subset of the set of frequency resources. In some examples, the PA Coefficient Reception Manager 1030 may be configured as or otherwise support a means for receiving, from the second UE, a second set of power amplifier coefficient values associated with the non-linear impairment compensation function based on the demodulation reference signal pattern.

In some examples, the PA Coefficient Application Manager 1040 may be configured as or otherwise support a means for combining the set of power amplifier coefficient values and the second set of power amplifier coefficient values. In some examples, the PA Coefficient Application Manager 1040 may be configured as or otherwise support a means for updating the non-linear impairment compensation function according to the combining, where transmitting the downlink signaling is based on the updated non-linear impairment compensation function.

In some examples, the PA Coefficient Reception Manager 1030 may be configured as or otherwise support a means for receiving, from the UE based on transmitting the downlink signaling, a second set of power amplifier coefficient values associated with a non-linear impairment compensation function based on the demodulation reference signal pattern. In some examples, the PA Coefficient Application Manager 1040 may be configured as or otherwise support a means for updating the non-linear impairment compensation function according to the second set of power amplifier coefficient values. In some examples, the Downlink Transmission Manager 1035 may be configured as or otherwise support a means for transmitting additional downlink signaling based on applying the updated non-linear impairment compensation function.

Figure 11:
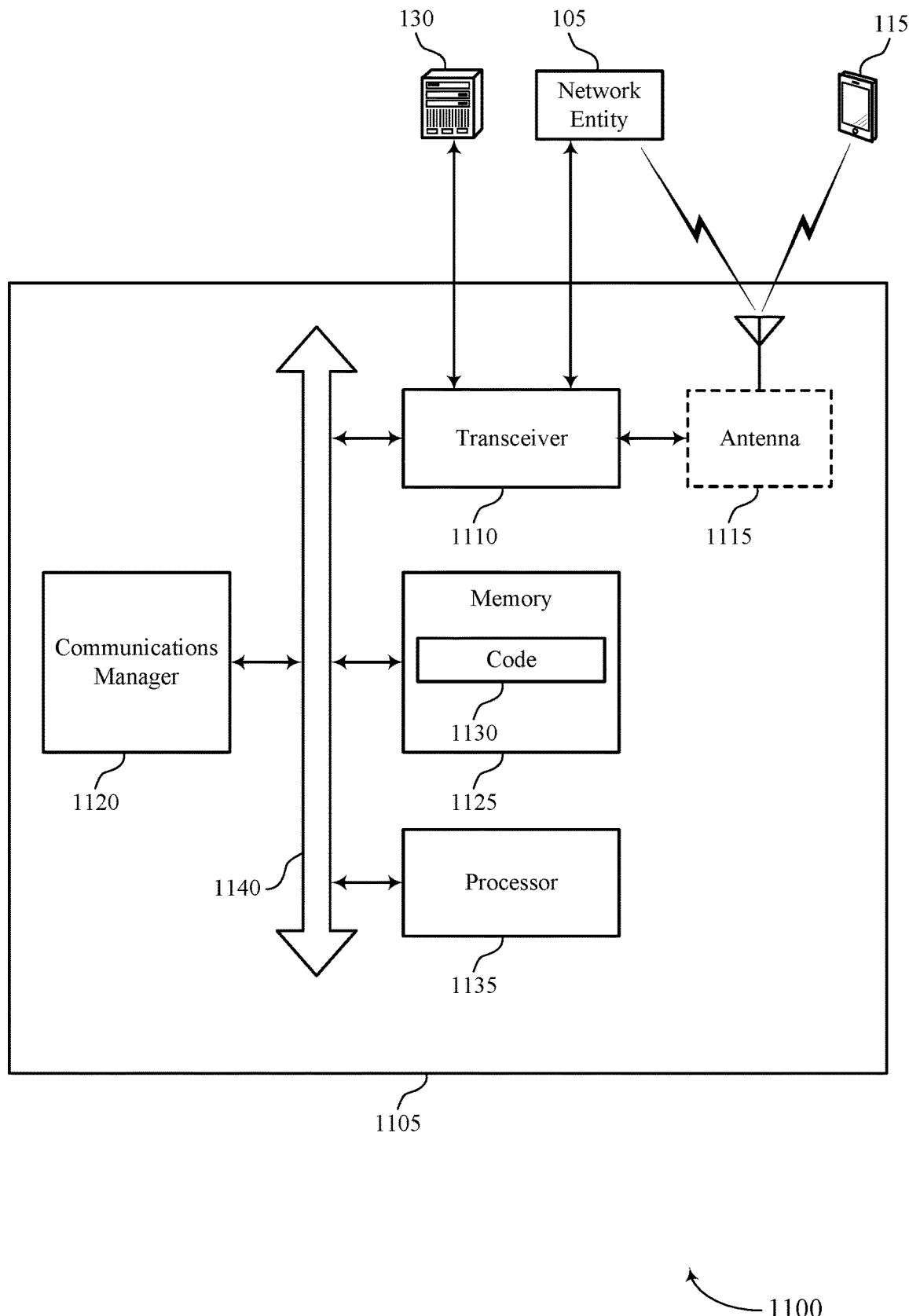
FIG. 11 illustrates a diagram of a system including a device that supports demodulation reference signal sharing across UEs supporting OTA DPD in accordance with one or more aspects of the present disclosure.

FIG. 11 illustrates a diagram of a system 1100 including a device 1105 that supports demodulation reference signal sharing across UEs supporting OTA DPD in accordance with one or more aspects of the present disclosure. The device 1105 may be an example of or include the components of a device 805, a device 905, or a network entity 105 as described herein. The device 1105 may communicate with one or more network entities 105, one or more UEs 115, or any combination thereof, which may include communications over one or more wired interfaces, over one or more wireless interfaces, or any combination thereof. The device 1105 may include components that support outputting and obtaining communications, such as a communications manager 1120, a transceiver 1110, an antenna 1115, a memory 1125, code 1130, and a processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. In some implementations, the transceiver 1110 may include one or more interfaces, such as one or more interfaces coupled with the one or more antennas 1115 that are configured to support various receiving or obtaining operations, or one or more interfaces coupled with the one or more antennas 1115 that are configured to support various transmitting or outputting operations, or a combination thereof. In some implementations, the transceiver 1110 may include or be configured for coupling with one or more processors or memory components that are operable to perform or support operations based on received or obtained information or signals, or to generate information or other signals for transmission or other outputting, or any combination thereof. In some implementations, the transceiver 1110, or the transceiver 1110 and the one or more antennas 1115, or the transceiver 1110 and the one or more antennas 1115 and one or more processors or memory components (for example, the processor 1135, or the memory 1125, or both), may be included in a chip or chip assembly that is installed in the device 1105. In some examples, the transceiver may be operable to support communications via one or more communications links (e.g., a communication link 125, a backhaul communication link 120, a midhaul communication link 162, a fronthaul communication link 168).

The memory 1125 may include RAM and ROM. The memory 1125 may store computer-readable, computer-executable code 1130 including instructions that, when executed by the processor 1135, cause the device 1105 to perform various functions described herein. The code 1130 may be stored in a non-transitory computer-readable medium such as system memory or another type of memory. In some cases, the code 1130 may not be directly executable by the processor 1135 but may cause a computer (e.g., when compiled and executed) to perform functions described herein. In some cases, the memory 1125 may contain, among other things, a BIOS which may control basic hardware or software operation such as the interaction with peripheral components or devices.

The processor 1135 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1135 may be configured to operate a memory array using a memory controller. In some other cases, a memory controller may be integrated into the processor 1135. The processor 1135 may be configured to execute computer-readable instructions stored in a memory (e.g., the memory 1125) to cause the device 1105 to perform various functions (e.g., functions or tasks supporting demodulation reference signal sharing across UEs supporting OTA DPD). For example, the device 1105 or a component of the device 1105 may include a processor 1135 and memory 1125 coupled with the processor 1135, the processor 1135 and memory 1125 configured to perform various functions described herein. The processor 1135 may be an example of a cloud-computing platform (e.g., one or more physical nodes and supporting software such as operating systems, virtual machines, or container instances) that may host the functions (e.g., by executing code 1130) to perform the functions of the device 1105. The processor 1135 may be any one or more suitable processors capable of executing scripts or instructions of one or more software programs stored in the device 1105 (such as within the memory 1125). In some implementations, the processor 1135 may be a component of a processing system. A processing system may generally refer to a system or series of machines or components that receives inputs and processes the inputs to produce a set of outputs (which may be passed to other systems or components of, for example, the device 1105). For example, a processing system of the device 1105 may refer to a system including the various other components or subcomponents of the device 1105, such as the processor 1135, or the transceiver 1110, or the communications manager 1120, or other components or combinations of components of the device 1105. The processing system of the device 1105 may interface with other components of the device 1105, and may process information received from other components (such as inputs or signals) or output information to other components. For example, a chip or modem of the device 1105 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1105 may transmit information output from the chip or modem. Additionally, or alternatively, in some implementations, the one or more interfaces may refer to an interface between the processing system of the chip or modem and a receiver, such that the device 1105 may obtain information or signal inputs, and the information may be passed to the processing system. A person having ordinary skill in the art will readily recognize that a first interface also may obtain information or signal inputs, and a second interface also may output information or signal outputs.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the memory 1125, the code 1130, and the processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with other network entities 105, and may include a controller or scheduler for controlling communications with UEs 115 in cooperation with other network entities 105. In some examples, the communications manager 1120 may support an X2 interface within an LTE/LTE-A wireless communications network technology to provide communication between network entities 105.

The communications manager 1120 may support wireless communications at a network entity in accordance with examples as disclosed herein. For example, the communications manager 1120 may be configured as or otherwise support a means for transmitting, to a UE, control signaling indicating a demodulation reference signal pattern associated with a set of frequency resources, where a set of multiple subsets of the set of frequency resources are allocated to respective UEs of a set of frequency-division multiplexed UEs including the UE. The communications manager 1120 may be configured as or otherwise support a means for receiving, from the UE, a set of power amplifier coefficient values associated with a non-linear impairment compensation function based on the demodulation reference signal pattern. The communications manager 1120 may be configured as or otherwise support a means for transmitting, to the UE, downlink signaling based on the set of power amplifier coefficient values.

By including or configuring the communications manager 1120 in accordance with examples as described herein, the device 1105 may support techniques for NL impairment compensation and coefficient reporting resulting in improved user experience, reduced processing, more efficient utilization of communication resources, increased reliability of wireless communications, decreased signaling overhead, and improved user experience.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the transceiver 1110, the processor 1135, the memory 1125, the code 1130, or any combination thereof. For example, the code 1130 may include instructions executable by the processor 1135 to cause the device 1105 to perform various aspects of demodulation reference signal sharing across UEs supporting OTA DPD as described herein, or the processor 1135 and the memory 1125 may be otherwise configured to perform or support such operations.

Figure 12:
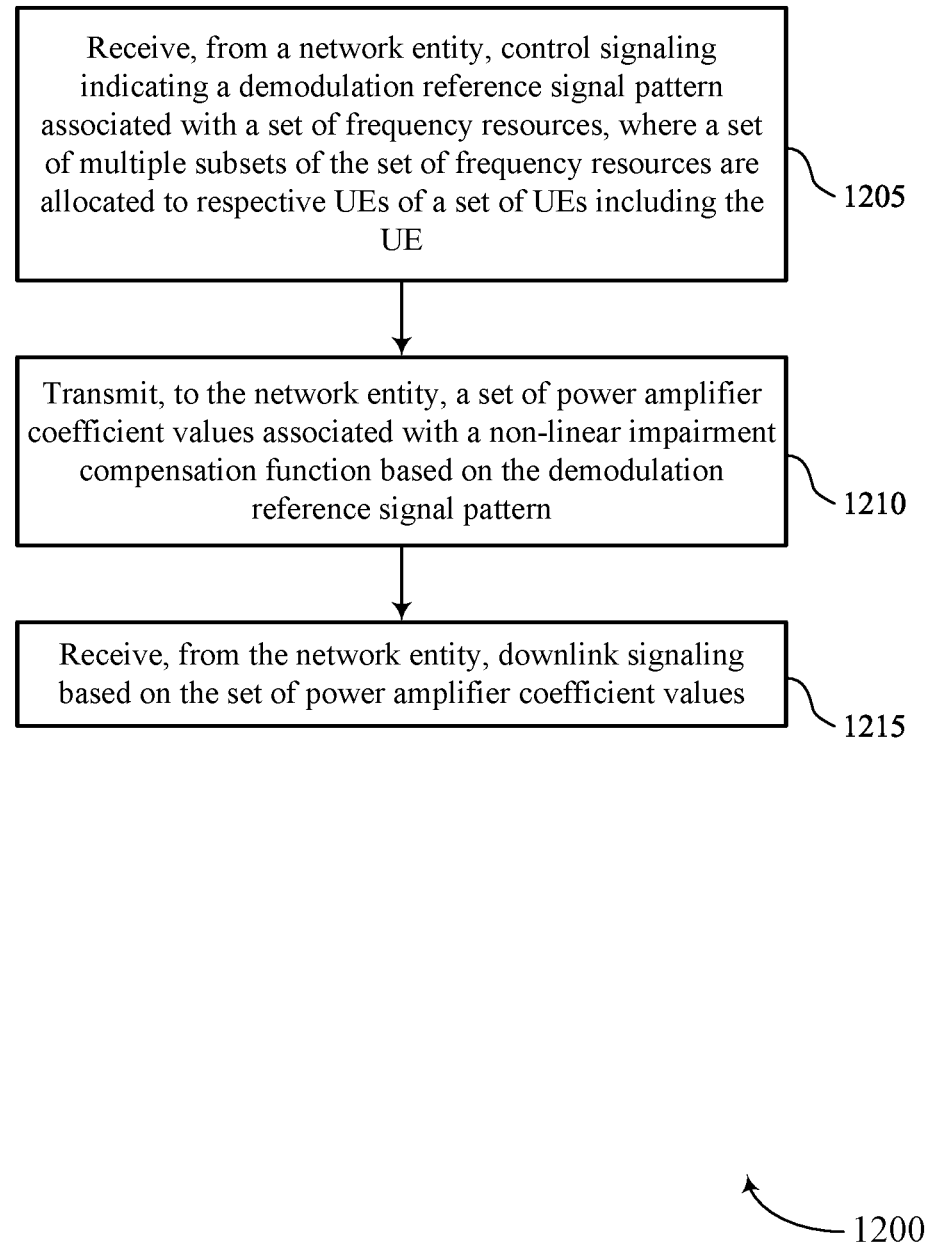
FIGS. 12 through 15 illustrate flowcharts showing methods that support demodulation reference signal sharing across UEs supporting OTA DPD in accordance with one or more aspects of the present disclosure.

FIG. 12 illustrates a flowchart showing a method 1200 that supports demodulation reference signal sharing across UEs supporting OTA DPD in accordance with one or more aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include receiving, from a network entity, control signaling indicating a demodulation reference signal pattern associated with a set of frequency resources, where a set of multiple subsets of the set of frequency resources are allocated to respective UEs of a set of UEs including the UE. The operations of 1205 may be performed in accordance with examples as disclosed herein. In some examples, aspects of the operations of 1205 may be performed by a DMRS Pattern Manager 625 as described with reference to FIG. 6.

At 1210, the method may include transmitting a set of power amplifier coefficient values associated with a non-linear impairment compensation function based on the demodulation reference signal pattern. The operations of 1210 may be performed in accordance with examples as disclosed herein. In some examples, aspects of the operations of 1210 may be performed by a PA Coefficient Report Manager 630 as described with reference to FIG. 6.

At 1215, the method may include receiving downlink signaling based on the set of power amplifier coefficient values. The operations of 1215 may be performed in accordance with examples as disclosed herein. In some examples, aspects of the operations of 1215 may be performed by a Downlink Transmission Manager 635 as described with reference to FIG. 6.

Figure 13:
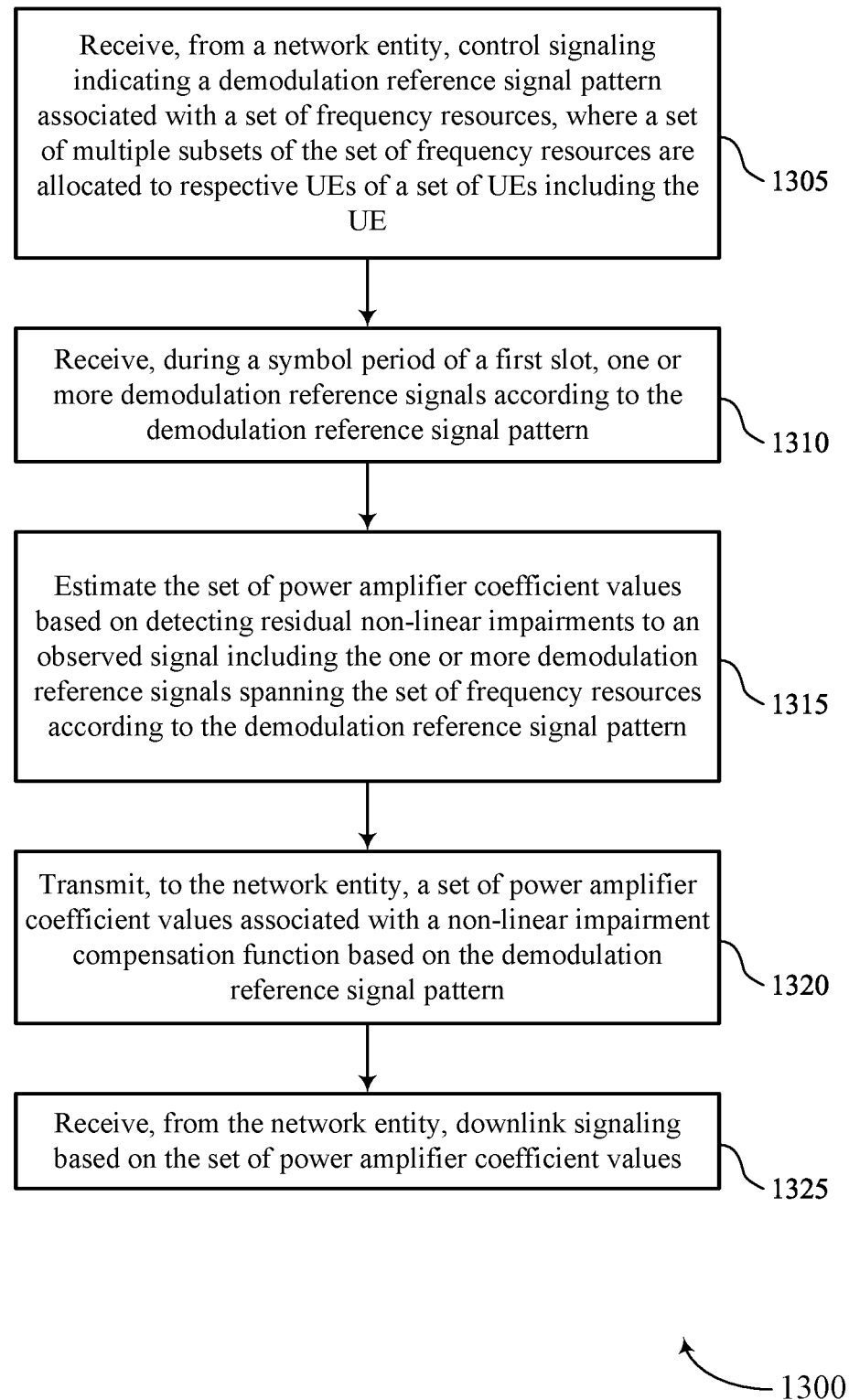

FIG. 13 illustrates a flowchart showing a method 1300 that supports demodulation reference signal sharing across UEs supporting OTA DPD in accordance with one or more aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1305, the method may include receiving, from a network entity, control signaling indicating a demodulation reference signal pattern associated with a set of frequency resources, where a set of multiple subsets of the set of frequency resources are allocated to respective UEs of a set of UEs including the UE. The operations of 1305 may be performed in accordance with examples as disclosed herein. In some examples, aspects of the operations of 1305 may be performed by a DMRS Pattern Manager 625 as described with reference to FIG. 6.

At 1310, the method may include receiving, during a symbol period of a first slot, one or more demodulation reference signals according to the demodulation reference signal pattern. The operations of 1310 may be performed in accordance with examples as disclosed herein. In some examples, aspects of the operations of 1310 may be performed by a DMRS Pattern Manager 625 as described with reference to FIG. 6.

At 1315, the method may include estimating the set of power amplifier coefficient values based on detecting residual non-linear impairments to an observed signal including the one or more demodulation reference signals spanning the set of frequency resources according to the demodulation reference signal pattern. The operations of 1315 may be performed in accordance with examples as disclosed herein. In some examples, aspects of the operations of 1315 may be performed by a PA Coefficient Estimation Manager 640 as described with reference to FIG. 6.

At 1320, the method may include transmitting a set of power amplifier coefficient values associated with a non-linear impairment compensation function based on the demodulation reference signal pattern. The operations of 1320 may be performed in accordance with examples as disclosed herein. In some examples, aspects of the operations of 1320 may be performed by a PA Coefficient Report Manager 630 as described with reference to FIG. 6.

At 1325, the method may include receiving downlink signaling based on the set of power amplifier coefficient values. The operations of 1325 may be performed in accordance with examples as disclosed herein. In some examples, aspects of the operations of 1325 may be performed by a Downlink Transmission Manager 635 as described with reference to FIG. 6.

Figure 14:
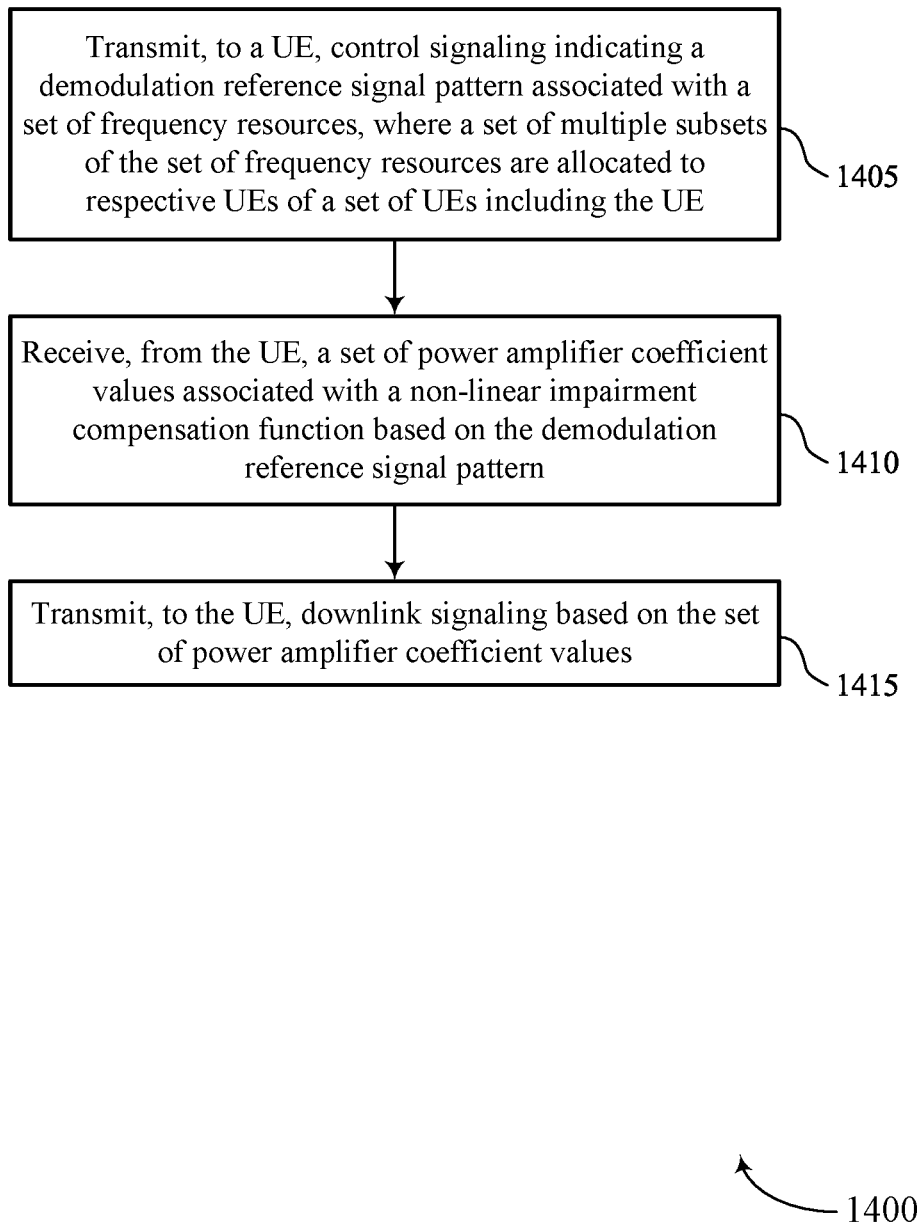

FIG. 14 illustrates a flowchart showing a method 1400 that supports demodulation reference signal sharing across UEs supporting OTA DPD in accordance with one or more aspects of the present disclosure. The operations of the method 1400 may be implemented by a network entity or its components as described herein. For example, the operations of the method 1400 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1405, the method may include transmitting, to a UE, control signaling indicating a demodulation reference signal pattern associated with a set of frequency resources, where a set of multiple subsets of the set of frequency resources are allocated to respective UEs of a set of frequency-division multiplexed UEs including the UE. The operations of 1405 may be performed in accordance with examples as disclosed herein. In some examples, aspects of the operations of 1405 may be performed by a DMRS Pattern Manager 1025 as described with reference to FIG. 10.

At 1410, the method may include receiving, from the UE, a set of power amplifier coefficient values associated with a non-linear impairment compensation function based on the demodulation reference signal pattern. The operations of 1410 may be performed in accordance with examples as disclosed herein. In some examples, aspects of the operations of 1410 may be performed by a PA Coefficient Reception Manager 1030 as described with reference to FIG. 10.

At 1415, the method may include transmitting, to the UE, downlink signaling based on the set of power amplifier coefficient values. The operations of 1415 may be performed in accordance with examples as disclosed herein. In some examples, aspects of the operations of 1415 may be performed by a Downlink Transmission Manager 1035 as described with reference to FIG. 10.

Figure 15:
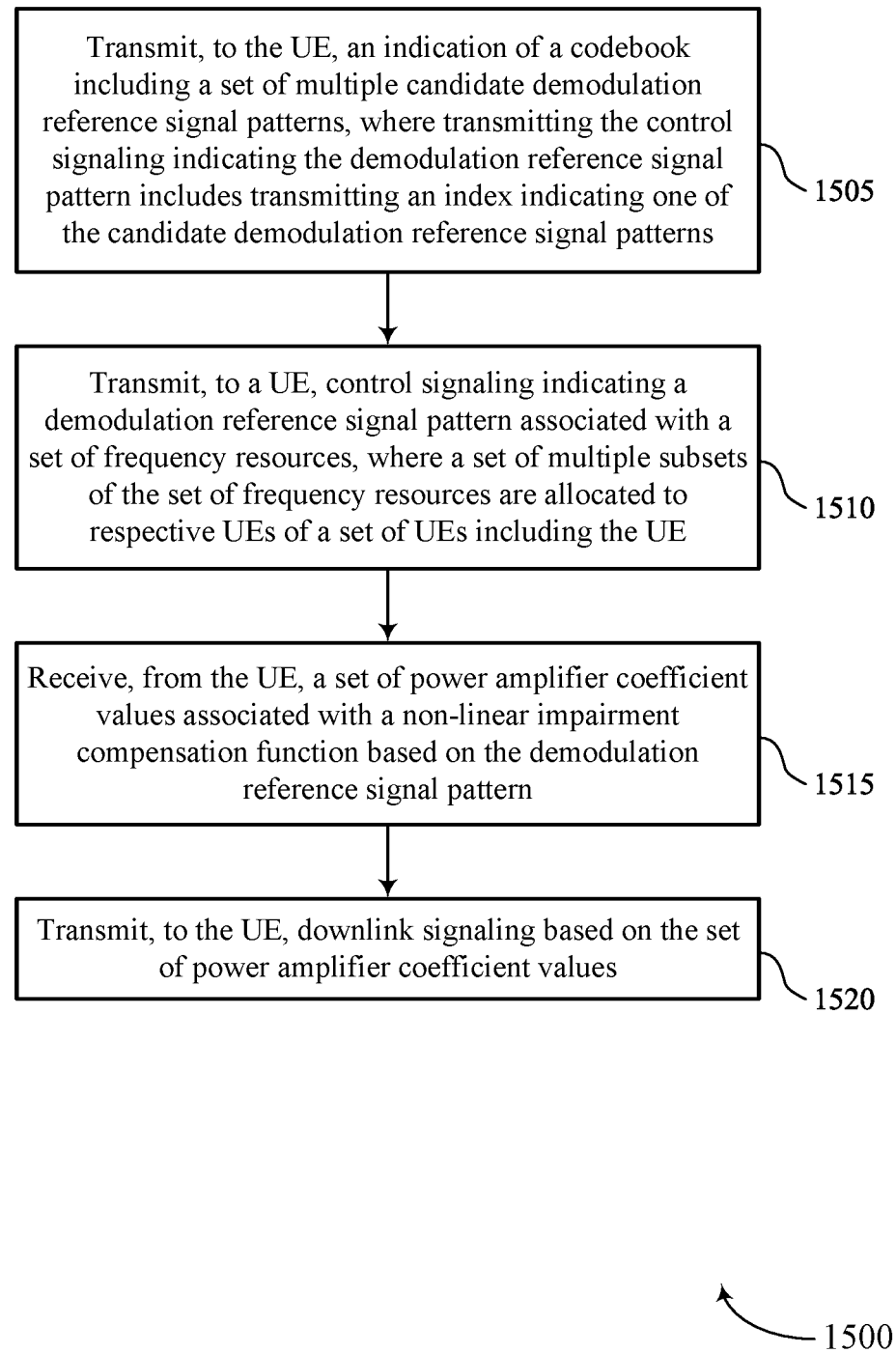

FIG. 15 illustrates a flowchart showing a method 1500 that supports demodulation reference signal sharing across UEs supporting OTA DPD in accordance with one or more aspects of the present disclosure. The operations of the method 1500 may be implemented by a network entity or its components as described herein. For example, the operations of the method 1500 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1505, the method may include transmitting, to the UE, an indication of a codebook including a set of multiple candidate demodulation reference signal patterns, where transmitting the control signaling indicating the demodulation reference signal pattern includes transmitting an index indicating one of the candidate demodulation reference signal patterns. The operations of 1505 may be performed in accordance with examples as disclosed herein. In some examples, aspects of the operations of 1505 may be performed by a DMRS Pattern Manager 1025 as described with reference to FIG. 10.

At 1510, the method may include transmitting, to a UE, control signaling indicating a demodulation reference signal pattern associated with a set of frequency resources, where a set of multiple subsets of the set of frequency resources are allocated to respective UEs of a set of frequency-division multiplexed UEs including the UE. The operations of 1510 may be performed in accordance with examples as disclosed herein. In some examples, aspects of the operations of 1510 may be performed by a DMRS Pattern Manager 1025 as described with reference to FIG. 10.

At 1515, the method may include receiving, from the UE, a set of power amplifier coefficient values associated with a non-linear impairment compensation function based on the demodulation reference signal pattern. The operations of 1515 may be performed in accordance with examples as disclosed herein. In some examples, aspects of the operations of 1515 may be performed by a PA Coefficient Reception Manager 1030 as described with reference to FIG. 10.

At 1520, the method may include transmitting, to the UE, downlink signaling based on the set of power amplifier coefficient values. The operations of 1520 may be performed in accordance with examples as disclosed herein. In some examples, aspects of the operations of 1520 may be performed by a Downlink Transmission Manager 1035 as described with reference to FIG. 10.

The following provides an overview of aspects of the present disclosure:

Aspect 1: A method for wireless communications at a UE, comprising: receiving, from a network entity, control signaling indicating a demodulation reference signal pattern associated with a set of frequency resources, wherein a plurality of frequency subsets of the set of frequency resources are allocated to respective UEs of a set of frequency-division multiplexed UEs comprising the UE; transmitting a set of power amplifier coefficient values associated with a non-linear impairment compensation function based at least in part on the demodulation reference signal pattern; and receiving downlink signaling based at least in part on the set of power amplifier coefficient values.

Aspect 2: The method of aspect 1, further comprising: receiving, during a symbol period of a first slot, one or more demodulation reference signals according to the demodulation reference signal pattern; and estimating the set of power amplifier coefficient values based at least in part on detecting residual non-linear impairments to an observed signal comprising the one or more demodulation reference signals spanning the set of frequency resources according to the demodulation reference signal pattern.

Aspect 3: The method of aspect 2, further comprising: receiving control signaling allocating one subset of the set of frequency resources for wireless communications by the UE; monitoring the set of frequency resources for downlink communications during one or more symbol periods of a slot, wherein receiving the one or more demodulation reference signals is based at least in part on the monitoring; and performing one or more measurements for the set of frequency resources during a symbol period allocated for demodulation reference signals according to the demodulation reference signal pattern, wherein estimating the set of power amplifier coefficient values is based at least in part on the monitoring.

Aspect 4: The method of any of aspects 1 through 3, further comprising: receiving, from the network entity, an indication of a codebook comprising a plurality of candidate demodulation reference signal patterns, wherein receiving the control signaling indicating the demodulation reference signal pattern comprises receiving an index indicating one of the plurality of candidate demodulation reference signal patterns.

Aspect 5: The method of any of aspects 1 through 4, further comprising: estimating a channel quality based at least in part on the demodulation reference signal pattern, wherein the set of power amplifier coefficient values are based at least in part on the estimated channel quality.

Aspect 6: The method of any of aspects 1 through 5, further comprising: detecting an initial residual non-linear impairment to a first observed signal associated with one or more demodulation reference signals received according to the demodulation reference signal pattern; and detecting an updated residual non-linear impairment to a second observed signal associated with the downlink signaling, wherein the updated residual non-linear impairment to the second observed signal is less than the initial residual non-linear impairment to the first observed signal based at least in part on the set of power amplifier coefficient values.

Aspect 7: A method for wireless communications at a network entity, comprising: transmitting, to a UE, control signaling indicating a demodulation reference signal pattern associated with a set of frequency resources, wherein a plurality of frequency subsets of the set of frequency resources are allocated to respective UEs of a set of frequency-division multiplexed UEs comprising the UE; receiving, from the UE, a set of power amplifier coefficient values associated with a non-linear impairment compensation function based at least in part on the demodulation reference signal pattern; and transmitting, to the UE, downlink signaling based at least in part on the set of power amplifier coefficient values.

Aspect 8: The method of aspect 7, further comprising: transmitting, to the UE, an indication of a codebook comprising a plurality of candidate demodulation reference signal patterns, wherein transmitting the control signaling indicating the demodulation reference signal pattern comprises transmitting an index indicating one of the candidate demodulation reference signal patterns.

Aspect 9: The method of any of aspects 7 through 8, further comprising: transmitting one or more demodulation reference signals during a symbol of a first slot without applying the non-linear impairment compensation function; and updating the non-linear impairment compensation function according to the set of power amplifier coefficient values, wherein transmitting the downlink signaling is based at least in part on applying the updated non-linear impairment compensation function.

Aspect 10: The method of any of aspects 7 through 9, further comprising: transmitting, to a second UE of the set of UEs, control signaling indicating the demodulation reference signal pattern associated with the set of frequency resources, wherein the UE is allocated a first subset of the set of frequency resources and the second UE is allocated a second subset of the set of frequency resources; and receiving, from the second UE, a second set of power amplifier coefficient values associated with the non-linear impairment compensation function based at least in part on the demodulation reference signal pattern.

Aspect 11: The method of aspect 10, further comprising: combining the set of power amplifier coefficient values and the second set of power amplifier coefficient values; and updating the non-linear impairment compensation function according to the combining, wherein transmitting the downlink signaling is based at least in part on the updated non-linear impairment compensation function.

Aspect 12: The method of any of aspects 7 through 11, further comprising: receiving, from the UE based at least in part on transmitting the downlink signaling, a second set of power amplifier coefficient values associated with a non-linear impairment compensation function based at least in part on the demodulation reference signal pattern; updating the non-linear impairment compensation function according to the second set of power amplifier coefficient values; and transmitting additional downlink signaling based at least in part on applying the updated non-linear impairment compensation function.

Aspect 13: An apparatus for wireless communications at a UE, comprising a processor; memory coupled with the processor; and instructions stored in the memory and executable by the processor to cause the apparatus to perform a method of any of aspects 1 through 6.

Aspect 14: An apparatus for wireless communications at a UE, comprising at least one means for performing a method of any of aspects 1 through 6.

Aspect 15: A non-transitory computer-readable medium storing code for wireless communications at a UE, the code comprising instructions executable by a processor to perform a method of any of aspects 1 through 6.

Aspect 16: An apparatus for wireless communications at a network entity, comprising a processor; memory coupled with the processor; and instructions stored in the memory and executable by the processor to cause the apparatus to perform a method of any of aspects 7 through 12.

Aspect 17: An apparatus for wireless communications at a network entity, comprising at least one means for performing a method of any of aspects 7 through 12.

Aspect 18: A non-transitory computer-readable medium storing code for wireless communications at a network entity, the code comprising instructions executable by a processor to perform a method of any of aspects 7 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
a processor;
memory coupled with the processor; and
instructions stored in the memory and executable by the processor to cause the apparatus to:
receive, from a network entity, control signaling indicating a demodulation reference signal pattern associated with a set of frequency resources, wherein a plurality of frequency subsets of the set of frequency resources are allocated to respective UEs of a set of frequency-division multiplexed UEs comprising the UE;
transmit a set of power amplifier coefficient values associated with a non-linear impairment compensation function based at least in part on the demodulation reference signal pattern; and
receive downlink signaling based at least in part on the set of power amplifier coefficient values.

2. The apparatus of claim 1, wherein the instructions are further executable by the processor to cause the apparatus to:
receive, during a symbol period of a first slot, one or more demodulation reference signals according to the demodulation reference signal pattern; and
estimate the set of power amplifier coefficient values based at least in part on detecting residual non-linear impairments to an observed signal comprising the one or more demodulation reference signals spanning the set of frequency resources according to the demodulation reference signal pattern.

3. The apparatus of claim 2, wherein the instructions are further executable by the processor to cause the apparatus to:
receive control signaling allocating one subset of the set of frequency resources for wireless communications by the UE;
monitor the set of frequency resources for downlink communications during one or more symbol periods of a slot, wherein receiving the one or more demodulation reference signals is based at least in part on the monitoring; and
perform one or more measurements for the set of frequency resources during a symbol period allocated for demodulation reference signals according to the demodulation reference signal pattern, wherein estimating the set of power amplifier coefficient values is based at least in part on the monitoring.

4. The apparatus of claim 1, wherein the instructions are further executable by the processor to cause the apparatus to:
receive, from the network entity, an indication of a codebook comprising a plurality of candidate demodulation reference signal patterns, wherein receiving the control signaling indicating the demodulation reference signal pattern comprises receiving an index indicating one of the plurality of candidate demodulation reference signal patterns.

5. The apparatus of claim 1, wherein the instructions are further executable by the processor to cause the apparatus to:
estimate a channel quality based at least in part on the demodulation reference signal pattern, wherein the set of power amplifier coefficient values are based at least in part on the estimated channel quality.

6. The apparatus of claim 1, wherein the instructions are further executable by the processor to cause the apparatus to:
detect an initial residual non-linear impairment to a first observed signal associated with one or more demodulation reference signals received according to the demodulation reference signal pattern; and
detect an updated residual non-linear impairment to a second observed signal associated with the downlink signaling, wherein the updated residual non-linear impairment to the second observed signal is less than the initial residual non-linear impairment to the first observed signal based at least in part on the set of power amplifier coefficient values.

7. An apparatus for wireless communications at a network entity, comprising:
a processor;
memory coupled with the processor; and
instructions stored in the memory and executable by the processor to cause the apparatus to:
transmit, to a user equipment (UE), control signaling indicating a demodulation reference signal pattern associated with a set of frequency resources, wherein a plurality of frequency subsets of the set of frequency resources are allocated to respective UEs of a set of frequency-division multiplexed UEs comprising the UE;
receive, from the UE, a set of power amplifier coefficient values associated with a non-linear impairment compensation function based at least in part on the demodulation reference signal pattern; and
transmit, to the UE, downlink signaling based at least in part on the set of power amplifier coefficient values.

8. The apparatus of claim 7, wherein the instructions are further executable by the processor to cause the apparatus to:
transmit, to the UE, an indication of a codebook comprising a plurality of candidate demodulation reference signal patterns, wherein transmitting the control signaling indicating the demodulation reference signal pattern comprises transmitting an index indicating one of the candidate demodulation reference signal patterns.

9. The apparatus of claim 7, wherein the instructions are further executable by the processor to cause the apparatus to:
transmit one or more demodulation reference signals during a symbol of a first slot without applying the non-linear impairment compensation function; and
update the non-linear impairment compensation function according to the set of power amplifier coefficient values, wherein transmitting the downlink signaling is based at least in part on applying the updated non-linear impairment compensation function.

10. The apparatus of claim 7, wherein the instructions are further executable by the processor to cause the apparatus to:
transmit, to a second UE of the set of UEs, control signaling indicating the demodulation reference signal pattern associated with the set of frequency resources, wherein the UE is allocated a first subset of the set of frequency resources and the second UE is allocated a second subset of the set of frequency resources; and receive, from the second UE, a second set of power amplifier coefficient values associated with the non-linear impairment compensation function based at least in part on the demodulation reference signal pattern.

11. The apparatus of claim 10, wherein the instructions are further executable by the processor to cause the apparatus to:

combine the set of power amplifier coefficient values and the second set of power amplifier coefficient values; and update the non-linear impairment compensation function according to the combining, wherein transmitting the downlink signaling is based at least in part on the updated non-linear impairment compensation function.

12. The apparatus of claim 7, wherein the instructions are further executable by the processor to cause the apparatus to:

receive, from the UE based at least in part on transmitting the downlink signaling, a second set of power amplifier coefficient values associated with a non-linear impairment compensation function based at least in part on the demodulation reference signal pattern;

update the non-linear impairment compensation function according to the second set of power amplifier coefficient values; and transmit additional downlink signaling based at least in part on applying the updated non-linear impairment compensation function.

13. A method for wireless communications at a user equipment (UE), comprising:

receiving, from a network entity, control signaling indicating a demodulation reference signal pattern associated with a set of frequency resources, wherein a plurality of frequency subsets of the set of frequency resources are allocated to respective UEs of a set of frequency-division multiplexed UEs comprising the UE;

transmitting a set of power amplifier coefficient values associated with a non-linear impairment compensation function based at least in part on the demodulation reference signal pattern; and receiving downlink signaling based at least in part on the set of power amplifier coefficient values.

14. The method of claim 13, further comprising:

receiving, during a symbol period of a first slot, one or more demodulation reference signals according to the demodulation reference signal pattern; and estimating the set of power amplifier coefficient values based at least in part on detecting residual non-linear impairments to an observed signal comprising the one or more demodulation reference signals spanning the set of frequency resources according to the demodulation reference signal pattern.

15. The method of claim 14, further comprising:

receiving control signaling allocating one subset of the set of frequency resources for wireless communications by the UE;

monitoring the set of frequency resources for downlink communications during one or more symbol periods of a slot, wherein receiving the one or more demodulation reference signals is based at least in part on the monitoring; and performing one or more measurements for the set of frequency resources during a symbol period allocated for demodulation reference signals according to the demodulation reference signal pattern, wherein estimating the set of power amplifier coefficient values is based at least in part on the monitoring.

16. The method of claim 13, further comprising:

receiving, from the network entity, an indication of a codebook comprising a plurality of candidate demodulation reference signal patterns, wherein receiving the control signaling indicating the demodulation reference signal pattern comprises receiving an index indicating one of the plurality of candidate demodulation reference signal patterns.

17. The method of claim 13, further comprising:

estimating a channel quality based at least in part on the demodulation reference signal pattern, wherein the set of power amplifier coefficient values are based at least in part on the estimated channel quality.

18. The method of claim 13, further comprising:

detecting an initial residual non-linear impairment to a first observed signal associated with one or more demodulation reference signals received according to the demodulation reference signal pattern; and detecting an updated residual non-linear impairment to a second observed signal associated with the downlink signaling, wherein the updated residual non-linear impairment to the second observed signal is less than the initial residual non-linear impairment to the first observed signal based at least in part on the set of power amplifier coefficient values.

19. A method for wireless communications at a network entity, comprising:

transmitting, to a user equipment (UE), control signaling indicating a demodulation reference signal pattern associated with a set of frequency resources, wherein a plurality of subsets of the set of frequency resources are allocated to respective UEs of a set of frequency-division multiplexed UEs comprising the UE;

receiving, from the UE, a set of power amplifier coefficient values associated with a non-linear impairment compensation function based at least in part on the demodulation reference signal pattern; and transmitting, to the UE, downlink signaling based at least in part on the set of power amplifier coefficient values.

20. The method of claim 19, further comprising:

transmitting, to the UE, an indication of a codebook comprising a plurality of candidate demodulation reference signal patterns, wherein transmitting the control signaling indicating the demodulation reference signal pattern comprises transmitting an index indicating one of the candidate demodulation reference signal patterns.

* * * * *